(12) United States Patent
Hastings et al.

(10) Patent No.: US 11,244,527 B2
(45) Date of Patent: Feb. 8, 2022

(54) FULLY AUTOMATED SCREENING SYSTEM AND METHOD

(71) Applicant: The Government of the United States of America, as represented by the Secretary of Homeland Security, Washington, DC (US)

(72) Inventors: William Hastings, Alexandria, VA (US); Sherif Ahmed, Starnberg (DE); James Gilkeson, Alexandria, VA (US); Douglas MacIvor, Arlington, VA (US); Luke Olsen, Alexandria, VA (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 6 days.

(21) Appl. No.: 16/839,763

(22) Filed: Apr. 3, 2020

(65) Prior Publication Data
US 2020/0320814 A1 Oct. 8, 2020

Related U.S. Application Data

(60) Provisional application No. 62/829,987, filed on Apr. 5, 2019, provisional application No. 62/935,370, filed on Nov. 14, 2019.

(51) Int. Cl.
*G07C 9/28* (2020.01)
*G06Q 50/26* (2012.01)
*G01V 5/00* (2006.01)
*G08B 21/18* (2006.01)

(52) U.S. Cl.
CPC ............ *G07C 9/28* (2020.01); *G01V 5/0041* (2013.01); *G06Q 50/265* (2013.01); *G08B 21/182* (2013.01)

(58) Field of Classification Search
CPC .. G01V 5/0008; G01V 5/0041; G06Q 50/265; G07C 9/257; G07C 9/28; G08B 21/182
See application file for complete search history.

(56) References Cited

U.S. PATENT DOCUMENTS

| 5,694,867 | A | 12/1997 | Diaz-Lopez |
| 6,745,520 | B2 * | 6/2004 | Puskaric ............... E05G 5/003 49/142 |
| 7,139,406 | B2 | 11/2006 | McClelland et al. |
| 7,243,845 | B2 | 7/2007 | Cash et al. |
| 7,440,544 | B2 | 10/2008 | Scheinman et al. |

(Continued)

FOREIGN PATENT DOCUMENTS

WO 2013090515 A1 6/2013

*Primary Examiner* — Nader Bolourchi
(74) *Attorney, Agent, or Firm* — Lavanya Ratnam; Kelly G. Hyndman; Robert W. Busby

(57) ABSTRACT

Various embodiments of the present invention are directed toward systems and methods relating to security screening. For example, a screening system includes a chamber configured to accommodate a user to be screened, and a chamber scanner. The chamber scanner is configured to scan the user to identify whether the user is carrying an undivested item that needs to be divested. The chamber is configured to release the user to proceed from the chamber to a secure area, upon confirmation that no undivested items are to be divested.

33 Claims, 14 Drawing Sheets

(56) References Cited

U.S. PATENT DOCUMENTS

| | | | |
|---|---|---|---|
| 8,031,903 | B2 | 10/2011 | Paresi et al. |
| 9,116,513 | B2 | 8/2015 | Ambrefe, Jr. et al. |
| 9,481,197 | B2 | 11/2016 | Eckel et al. |
| 9,516,460 | B2 | 12/2016 | Ambrefe, Jr. |
| 9,721,081 | B2 | 8/2017 | Cornick et al. |
| 9,965,746 | B1 | 5/2018 | Keiser et al. |
| 10,387,976 | B2 | 8/2019 | Kundu et al. |
| 10,572,963 | B1 | 2/2020 | Cinnamon et al. |
| 2006/0206351 | A1 | 9/2006 | Hodges et al. |
| 2007/0268145 | A1 | 11/2007 | Bazakos et al. |
| 2010/0158191 | A1 | 6/2010 | Gray |
| 2011/0080315 | A1* | 4/2011 | Reilly ................... G01S 13/887 342/175 |
| 2017/0098357 | A1* | 4/2017 | Hoy ........................ G01V 3/00 |
| 2018/0246525 | A1 | 8/2018 | Hiramatsu et al. |

\* cited by examiner

FULLY AUTOMATED SCREENING SYSTEM AND METHOD

CROSS-REFERENCE TO RELATED APPLICATIONS

This application claims the benefit of priority from U.S. Provisional Application No. 62/829,987 entitled "Automated Screening," filed on Apr. 5, 2019, and U.S. Provisional Application No. 62/935,370 entitled "Fully Automated Screening System and Method," filed on Nov. 14, 2019, the disclosures of which are incorporated by reference in their entirety.

STATEMENT OF GOVERNMENT INTEREST

The claimed subject matter was partially made by one or more employees of the United States Department of Homeland Security in the performance of official duties.

FIELD

The present subject matter relates generally to the field of security, and more specifically to the field of security screening.

BACKGROUND

Security screening lanes today are labor intensive to operate. In an example, the TSA Pre-Check® program provides a risk-based security approach, through the use of dedicated security lanes having dedicated staffing, separate from those security lanes that are not TSA Pre-Check®. The TSA Pre-Check® lanes, and thus the entire checkpoint, have the potential to operate more efficiently, when there is a sufficient user population to maximize the utilization of the space and staffing dedicated to the TSA Pre-Check® lanes. However, this physical segmentation into dedicated lanes can lead to operational deficiency when the available passenger population is insufficient to warrant the dedicated space and staffing. Furthermore, reliance on dedicated screening lanes for various risk populations inherently limits risk-stratification opportunities to existing checkpoint space availability and can result in compounding degradation of resource utilization if the various risk pools cannot be equitably dispersed to all available screening locations.

SUMMARY

Example embodiments described herein provide a screening environment that deploys variable screening parameters consistent with a risk-based security approach, while simultaneously increasing passenger throughput, improving passenger experience, reducing checkpoint staffing requirements, and enabling the equitable dispersion of risk pools to available screening locations while efficiently utilizing available resources. For example, as described herein, airport security in-property or on-person screening systems are configured to provide algorithmic development of automated threat detection. On-person self-screening and intuitive detection technology alarm feedback is available directly to a passenger or user being screened, to facilitate self-resolution at a divestiture station. The screening of users can be self-completed without the need for a human operator or agent to initiate scans or provide passenger instructions.

Example systems include detection technologies deployed around a property divestment point fitted with instructional displays, enclosed in an ingress/egress access control system chamber. The chamber integrates with the divestment point and a property or item screening system (X-Ray or Computed Tomography or Future Capability) that is fitted with bin return capabilities. In another example, the divestment point is not within the chamber, but is accessible from an ingress path into the chamber. In yet another example, the chamber releases the user back into an unsecure area carrying undivested items, allowing the user to self-divest outside of the chamber, and return to the chamber for re-scanning.

Such systems provide a platform for dynamic risk-based variation in screening protocols, thereby decreasing secondary screening resolution pat-downs, increasing passenger throughput, and reducing security staffing needs. Intelligent scan initiation and creation of alarm information feedback loops enable real-time alarm resolution by the passenger or user during the divestment process. Example chambers provide access control to secure areas, do not need an operator to initiate screening, and reduce situations that need secondary resolution processes by allowing passengers to self-resolve alarms. Such features result in reduced need for onsite security screening personnel or agents for equipment operation and secondary screening.

Example embodiments of a screening system include a chamber configured to accommodate a user to be screened, a divestment interface accessible from within the chamber and configured to receive an item divested from the user, and a chamber scanner configured to scan the user to identify whether the user is carrying an undivested item that is to be divested to the divestment interface. The chamber is configured to release the user upon confirmation that no undivested items are to be divested.

In another example embodiment, a method for screening a user includes admitting a user into a chamber of a screening system responsive to establishing an identity of the user, prompting the user to divest an item into a divestment interface accessible from within the chamber, scanning the user via a chamber scanner disposed in the chamber to identify whether the user is carrying an undivested item that is to be divested to the divestment interface, confirming that no undivested items are to be divested, and releasing the user.

In yet another example embodiment, a system includes a divestment scanner configured to obtain a detailed item characterization of items to be divested from users to be screened, and a plurality of screening systems coupled to the divestment scanner. A given screening system includes a chamber configured to accommodate a user to be screened, and a divestment interface coupled to the divestment scanner and accessible from within the chamber. The divestment interface is configured to receive an item divested from the user. A chamber scanner is configured to scan the user to identify whether the user is carrying an undivested item that is to be divested to the divestment interface. The chamber is configured to release the user upon confirmation that no undivested items are to be divested.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

One or more example embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

These drawings are not intended to be exhaustive or to limit the subject matter to the precise form or forms disclosed. It should be understood that the present subject matter can be practiced with modification and alteration, and that the subject matter is limited only by the claims and the equivalents thereof.

DETAILED DESCRIPTION

Example embodiments described herein make use of an automated architecture, to minimize labor needed to staff a given security checkpoint, and to provide fully-automated, completely unstaffed security checkpoints. The automated architecture is capable of automatically clearing a scanned passenger or user, or initiating an alarm condition for the user, so that available staff is able to focus on clearing alarm conditions detected by the automated architecture. The automated architecture is built into gates providing access control, helping to control passenger or user flow as well as reducing the risk of a threat or alarm user breaking through a security lane. The automated gate provides access for cleared persons or users and can guide users to a specific path or paths to allow further or secondary screening and/or self-resolution by self-divestment of items. Such example system embodiments also may be referred to herein as "Self-Screening Portals" and/or Fully Automated Screening & Tailored Explanatory Resolution (FASTER) systems. Such example embodiments provide dynamic risk-based protocol detection, instruction or feedback to the user, self-divestiture or resolution, access control or direction, and other benefits and efficiencies as described herein.

Example embodiments implement a scanner configured to enable the passenger or user to self-analyze to assess risk, and/or embodiments consult a database to assess a user risk score, used for dynamically adjusting security thresholds to be applied to the user. The user is allowed to divest items, including divestment at the scanner itself, to ensure no prohibited items are carried into secure areas. Example systems are configured to receive and scan divested items for enhancing the intelligence of the scanning (e.g., learning feedback) to build upon a library of knowledge including whitelists and/or blacklists of allowed and/or prohibited items, leveraging confirmation feedback provided by operating agents, all done on-the-fly in the field without a need for dedicated lab resources to train the systems how to recognize threats or innocent items because they are self-learning while deployed. Systems allow a user or passenger to remedy issues and retry the scan, retrieve divested items following the scan, and direct the user or passenger to a particular next stage, or hold or securely lock up the user or passenger if needed.

Figure 1:
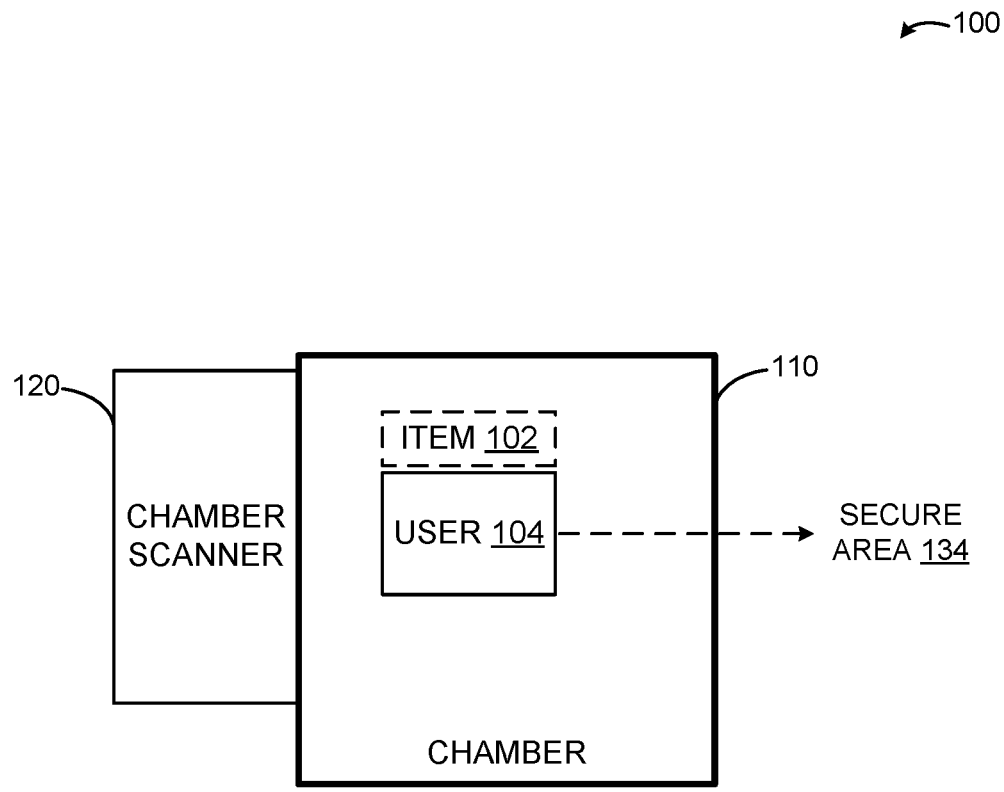
FIG. 1 illustrates a screening system including a chamber scanner according to an example embodiment.

FIG. 1 illustrates a screening system 100 including a chamber scanner 120 according to an example embodiment. The screening system 100 also includes a chamber 110 configured to accommodate a user 104 to be screened. A divestment interface is not included in the embodiment of FIG. 1, although other embodiments include a divestment interface or drop box accessible from within the chamber 110 and configured to receive an item 102 that is to be divested from the user 104. The screen system 100 enables the user 104 to exit the chamber 110 and self-divest (e.g., drink remaining beverages, throw away unwanted items, place items in the user's vehicle or checked luggage, or otherwise divest items 102 detected by the chamber scanner 120). The chamber scanner 120 is coupled to the chamber 110 and configured to scan the user 104 to identify whether the user 104 is carrying an undivested item 102 that is to be divested before the user is permitted to proceed to the secure area 134. The chamber 110 is configured to release the user 104 to the secure area 134 upon confirmation that no undivested items 102 remain to be divested (e.g., the item 102 is divested into a divestment interface or drop box within the chamber, or divested outside of the chamber), or upon confirmation that any items remaining with the user 104 are not prohibited in the secure area 134.

In a preferred embodiment, the divestment interface is within the chamber (e.g., as a slot, tray, or door accessing a divestment scanner such as a luggage x-ray scanner), or is anywhere in an ingress path, e.g. 460, to the chamber. In the embodiment with the divestment interface in the ingress path to the chamber, the chamber may optionally continue to be open to the ingress path during a scan or open to the ingress path upon detection of an object for divestment. The chamber is configurable to allow the user 104 to leave the chamber (e.g., via the ingress path or entrance door to the chamber) to proceed to an unsecure or upstream area, where the user 104 is free to divest prior to re-entering the chamber 110. In such an embodiment, the divestment interface may optionally be a garbage can, a drop box, a locker, checked luggage, the user's vehicle, a conveyor belt into an luggage scanner external to the chamber 110 that is presented to the user 104 prior to entering the chamber 110, or other such options to which the user 104 can divest item 102. In another example, the user 104 divests a beverage item 102 by exiting the chamber 110, drinking the item, and re-entering the chamber 110 for a follow-up scan to confirm the item 102 no longer needs to be divested.

The word "chamber" in this invention means any partial or complete enclosure or portal that impedes the user to be scanned from reaching a secure area until they have been cleared. "Chamber" is not limited to systems that are fully enclosed. For example, a chamber of this invention may have ingress doors as shown in FIG. 4 that slide back and forth, preventing the user from returning to the ingress path 460 during the scan. However, a chamber may also be completely open to ingress paths into the chamber 460. An advantage of a chamber open to ingress paths is that the divestment interface may be integrated with the luggage scanning drop provided to the users upstream of the chamber along the ingress path (e.g., see FIG. 2B). Similarly, an egress door 414 need not completely enclose a wall of the chamber so long as it impedes the user from entering the secure area. For example, an egress door may be two swinging doors that swing in from either side of the cavity. In another embodiment with less automation, there may be no egress door 414 but a security person may prevent a user from exiting until given a signal of clearance from the system. A chamber may also be open or partially open above, or below the user as shown in FIG. 4. As used herein, the term "chamber scanner" includes sensors or other scanning equipment included in a chamber, and also includes equipment that is exterior to or outside of the chamber. In an example, the chamber scanner is a screening scanner, and the chamber scanner itself, or a portion thereof, can serve as or otherwise provide the chamber 110.

Figure 2:
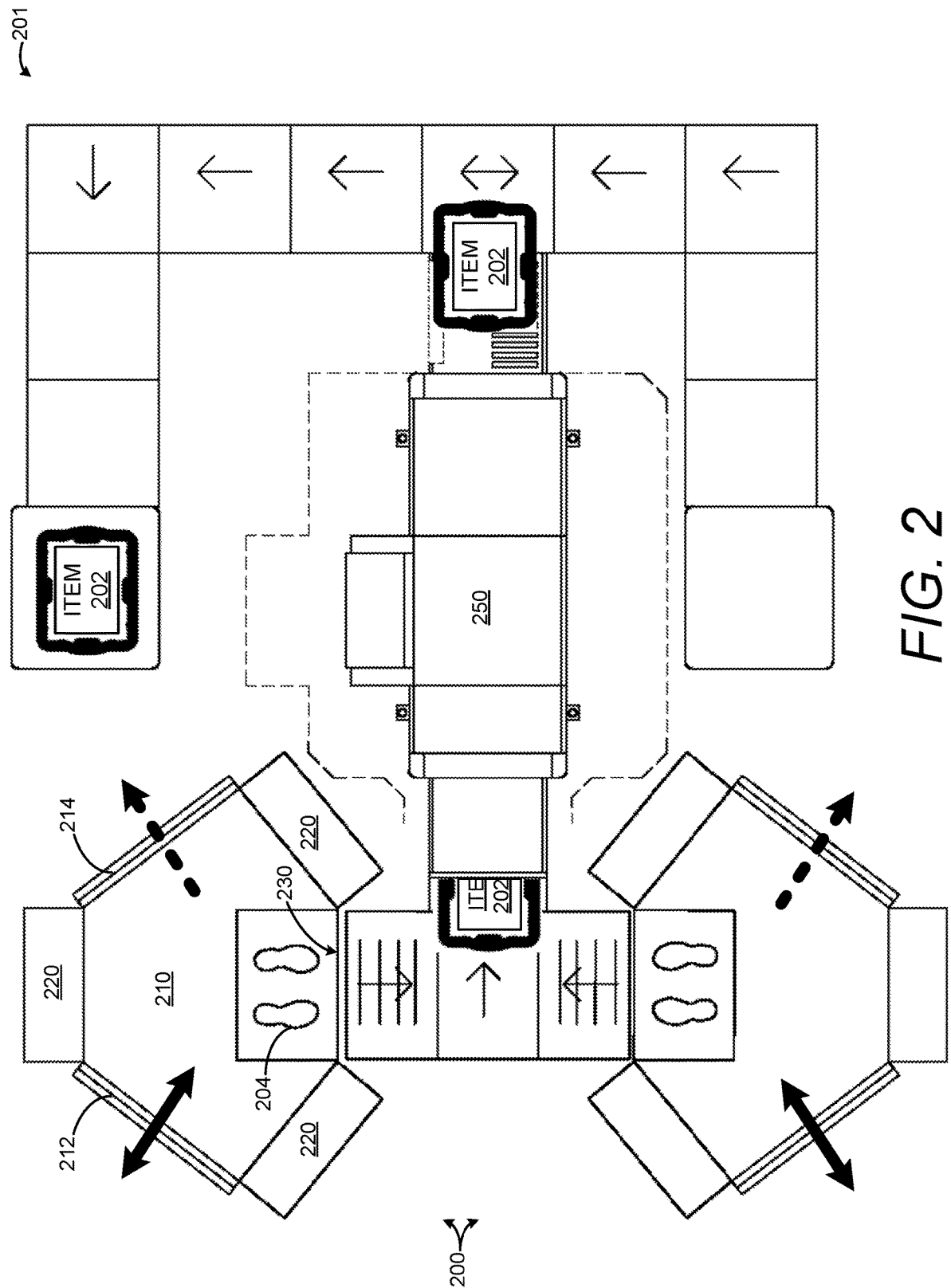
FIG. 2 illustrates a system including a plurality of screening systems and a divestment scanner according to an example embodiment.

FIG. 2 illustrates a system 201 including a plurality of screening systems 200 and a divestment scanner 250 according to an example embodiment. The divestment scanner 250 is coupled to the chamber 210 of the screening system 200 via a divestment interface 230. The divestment scanner 250 is configured to receive items 202 and obtain detailed item characterizations of items 202 divested from users 204. The divestment scanner 250 is shared between a plurality of screening systems 200. The divestment scanner 250 includes a series of conveyances (e.g., belts, rollers, or the like) configured to carry the items 202 from the divestment interface 230, through the divestment scanner 250, and then back to a waiting or recompose station proximate to the chamber 210, for convenient pickup upon exiting the chamber 210. In an embodiment, the series of conveyances are enclosed to prevent user access to items 202, until advanced to an open area after the user 204 is cleared to recover items.

The availability of multiple chambers 210 enables the system 201 to coordinate availability of each chamber, and selectively direct users 204 to enter a given chamber 210. In an example, the system 201 verifies the identity of a first user and confirms that the first user is a walk-up who is not prescheduled to undergo screening at the time. The system 201 also verifies the identity of a second user and confirms that the second user is prescheduled to undergo screening at this time. The system 201 then instructs the first user to wait and instructs the second user to proceed to an available chamber to undergo screening. The system 201 also directs a third user (unscheduled walk-up) to wait, even though a chamber is available, so that the system 201 reserves an available chamber for the next expected prescheduled user, which the system 201 is aware of and expecting, by accessing prescheduled screening information for yet-to-arrive users.

A given screening system 200 includes the chamber 210 to accommodate the user 204 to be screened. The example divestment interface 230 is accessible from within the chamber 210 and configured to receive items 202 divested from the user 204. At least one chamber scanner 220 (three scanners per chamber are shown) is configured to scan the user 204 to identify whether the user 204 is carrying an undivested item 202 that is to be divested, e.g., to the divestment interface 230 (or by leaving the chamber 210 via ingress door 212 to divest in an unsecure area). The chamber 210 also includes automated ingress door 212 and automated egress door 214. The egress door 214 is configured to release the user 204 upon confirmation that no undivested items 202 are to be divested. Although two doors are shown, other example embodiments use different numbers of doors (e.g., to direct the user 204 through a selected one of a plurality of doors, corresponding to one of several possible pathways, according to scan results).

The illustrated system 201 is based on a deployment configuration suited for security screening locations in which staffing resource optimization is a consideration. For example, the system 201 can operate in an unstaffed configuration, whereby users 204 are able to perform completely unattended self-screening (an agent can be summoned to handle specific issues or other anomalies, or such users can be directed to exit back out along the ingress path to the unsecure area, and proceed to another security checkpoint that is staffed). The illustrated deployment configuration leverages relatively smaller spaces to conduct screening, which spaces would otherwise not be conducive to traditional checkpoint infrastructure. Example applications include, but are not limited to, small airport locations, TSA Pre-Check® and/or priority passenger screening locations, employee screening locations, and so on. The example layout increases the utilization of the divestment scanner 250, e.g., by scanning a first user's divested item as soon as it is ready from a first chamber, without sitting idle while a second user is still preparing to divest in a second chamber. Such multiplexing of the divestment scanner 250 is capable of being increased, by adding additional chambers 210 which feed divested items to the divestment scanner 250 (e.g., via conveyor belts).

Figure 2A:
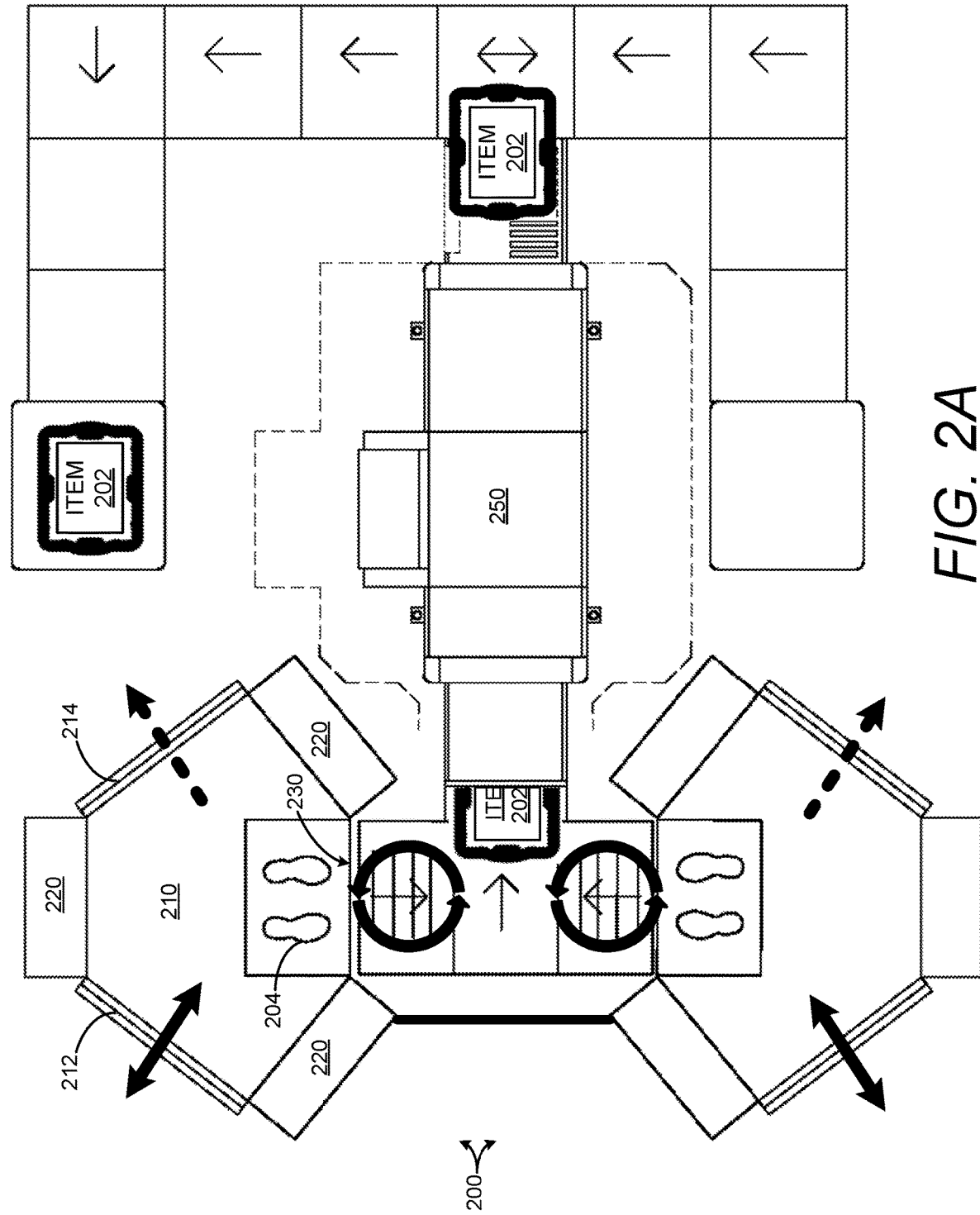
FIG. 2A illustrates a system including a plurality of screening systems and an isolated divestment interface according to an example embodiment.

FIG. 2A illustrates a system 201 including a plurality of screening systems 200 and an isolated divestment interface 230 according to an example embodiment. The isolated divestment interface 230 is walled-off, preventing the public from accessing divested items 202. Users 204 in each chamber 210 of the screening systems 200 divest their items onto a conveyor belt which feeds the divestment scanner 250. The walling-off of the isolated divestment interface 230 provides another example of how the various components of system 201 separate secure and unsecure areas, where the area to the left of the wall is unsecure, and the area to the right of the wall is also unsecure but isolated from the unsecure area to prevent access by the unsecure public, and the area to the right of the chambers and/or divestment scanner 250 is secure.

Figure 2B:
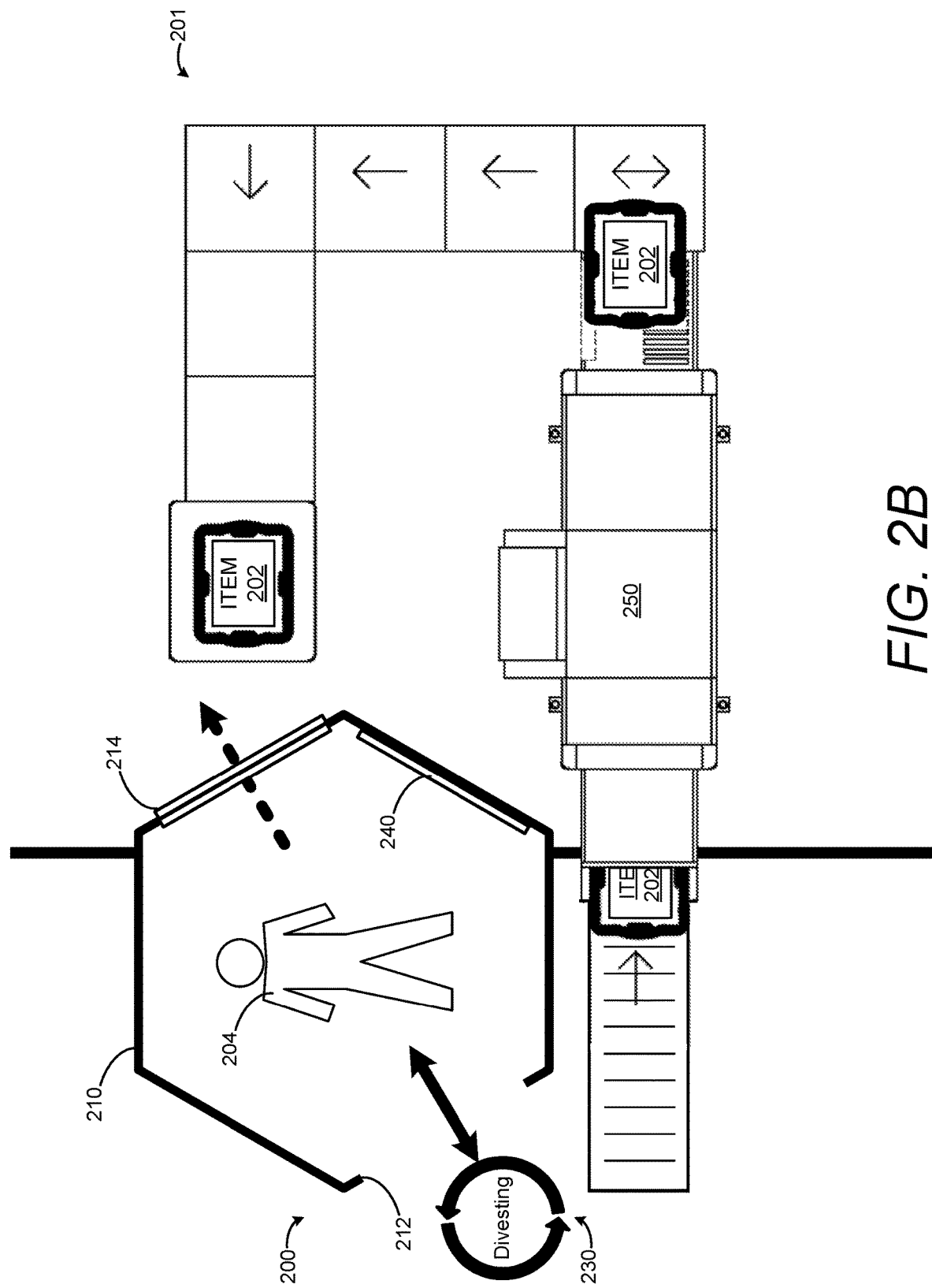
FIG. 2B illustrates a system including a screening system and an external divestment interface according to an example embodiment.

FIG. 2B illustrates a system 201 including a screening system 200 and an external divestment area or divestment interface 230 according to an example embodiment. The user 204 performs divesting outside of the chamber 210, because the area of divesting is not within the chamber 210. In the illustrated embodiment, the area of divesting is along an ingress path into the chamber 210. The ingress door 212 is formed as a fixed opening of the chamber 210, such that the chamber is a partial enclosure that is not fully enclosed but serves to impede the user from reaching a secure area beyond the chamber 210 via controlled egress door 214. The user 204 is shown in the chamber 210 and is free to move along the ingress path to divest at the divestment interface 230. Accordingly, upon receiving feedback from the user interface 240 (e.g., a display) that additional items need to be divested, the user 204 exits the chamber 210 via the ingress door 212 to access the area of divesting to perform additional divesting, placing additional items 202 on the conveyor belt to the divestment scanner 250. The conveyor belt itself is illustrated serving as a divestment interface 230. The user 204 can then re-enter the chamber 210 via the ingress door 212 for re-scanning (this process is repeatable, depending on a given configuration of the system 201). The egress door 214 is shown closed and provides controlled or selective exit for the user 204 upon confirmation that all items that need to be divested have been divested, and the user 204 is otherwise cleared for exit.

Figure 2C:
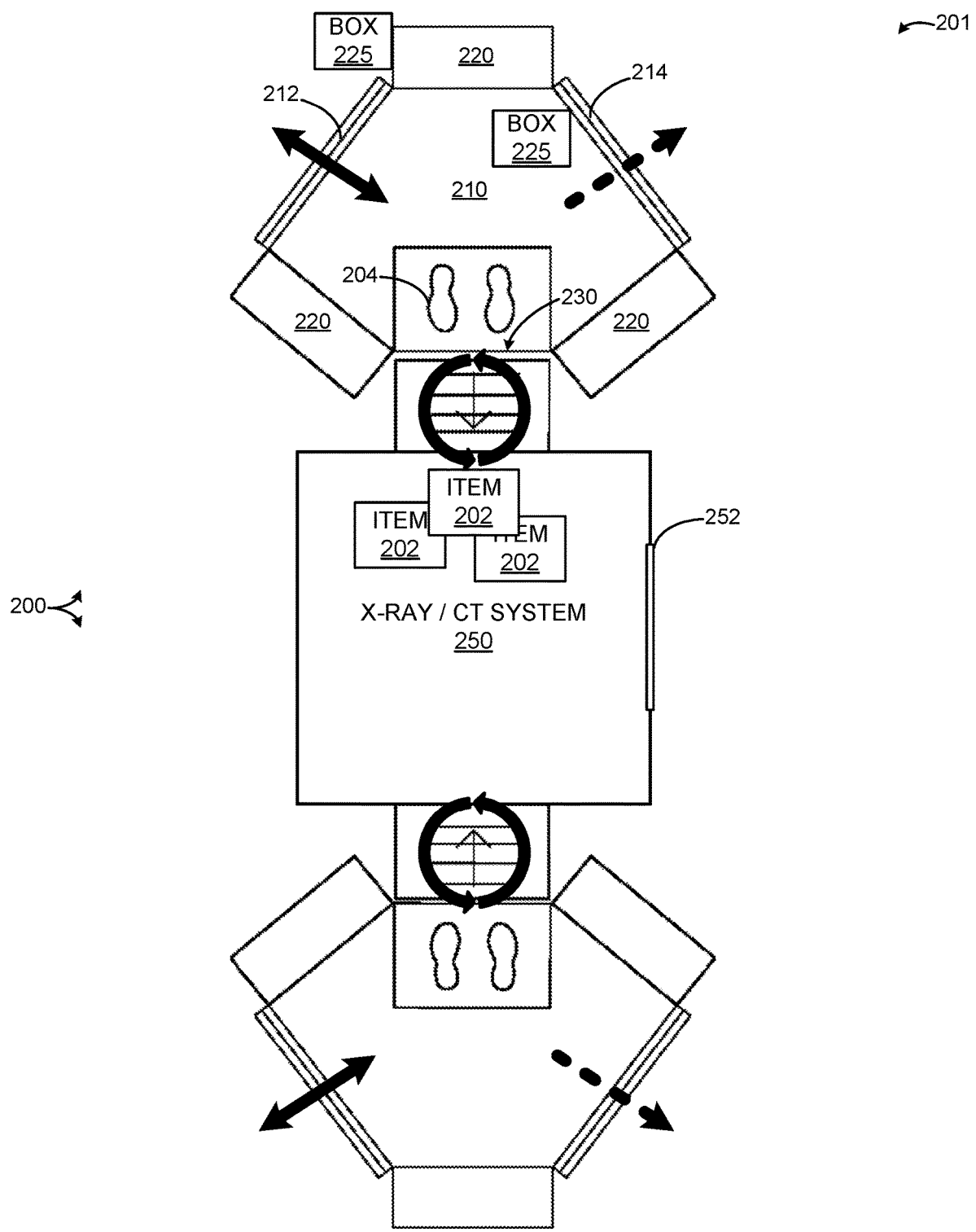
FIG. 2C illustrates a system including a plurality of screening systems and divestment interfaces according to an example embodiment.

FIG. 2C illustrates a system 201 including a plurality of screening systems 200 and divestment interfaces 230 according to an example embodiment. The user 204 performs self-divesting at the divestment interface 230 into the divestment scanner 250, which services multiple chambers 210. In an example usage scenario, the user 204 divests item or items 202 into the divestment scanner 250, which confirms that the items 202 are not prohibited. The user 204 then collects the divested item or items 202 and exits the chamber 210. In the illustrated embodiment, the system 201 is configured to occupy a relatively reduced space footprint compared to other embodiments, allowing the user 204 to better maintain control of their items 202 at all times, while eliminating the need for a complex bin return system and reducing the need for bag-checking staff or agents.

In an example, the user 204 divests and retrieves items 202 from the same divestment interface 230 accessible from within the chamber 210, without the user 204 needing to exit the chamber 210 to retrieve divested items 202. An embodiment of the system 201 includes a single conveyor belt to alternatively service both divestment interfaces of the two chambers 210 being used by two users 204, the belt operating to selectively retrieve from and return to a user divested items 202 to be scanned. In another embodiment, the system 201 does not include a conveyor belt, and instead the user 204 directly accesses the divestment scanner 250 via the divestment interface 230 to place items 202 directly from the chamber 210 into the divestment scanner 250.

The illustrated drop box 225 is shown accessible within the chamber 210 and is also deployable outside chamber 210. The drop box 225 provides one-way disposal of items, such as prohibited items, that once inserted, are no longer retrievable by the user 204. Accordingly, rather than exit the chamber 210 to dispose of prohibited items, the user 204 is free to dispose of prohibited items (such as razor blades) into the box 225 and be re-scanned.

In an example, the system 201 includes a divestment interface 230 having an actuated compartment and lid assembly, with a mechanical coupling to cause the actuated compartment to extend toward the user upon opening of the lid. Embodiments can employ various different compartments, similar to a fishing tackle box, to provide various compartments suitable for corresponding items 202 to be divested, and which extend outward to the user 204 as part of the mechanism for opening and closing the divestment interface 230. An example includes compartments for cell phones, tablets, laptops, loose change, keys, and/or other items typically carried by users 204. Such compartments are configured and arranged to automatically cause the divested items to be positioned in a desirable orientation suitable for efficient and effective scanning by the divestment scanner 250. For example, the tablet compartment causes the tablet to orient its screen toward the scanner, to avoid an edge-on scan.

Example systems 201 include safety features, such as barriers or compartments to prevent entry of people into the divestment scanner 250, and/or interlocks to prevent operation of the divestment scanner 250 until its lid is fully closed. An example system 201 includes an x-ray blocking shield that selectively deploys, e.g., automatically as part of the mechanism of the divestment interface 230. An example system 201 is modularized and includes a module that is specifically configured to receive a particular type of item 202. For example, the system 201 includes a liquid explosives detection screening module (not specifically shown; can be incorporated into the divestment interface 230). Liquid explosives detection screening is typically associated with an extended item scanning duration. Accordingly, the system 201 includes a notice informing users 204 that the system 201 is capable of scanning liquids carried by the user 204. The system 201 therefore enables users 204 to be free to choose whether to incur a longer scanning duration and/or wait line, in order to bring liquids through the system 201 into the sterile portion of the airport. The user 204 is also free to access another system 201 that does not include the liquid explosives detection screening module, and therefore enjoy a relatively faster screening throughput. Other embodiments include various other modules, enabling options to allow users 204 to fully self-screen according to advanced interactive screening procedures provided by the system 201 to the user 204, enabling the user 204 to divest into specialized receptacles corresponding to the various modularized systems. In an example installation, a plurality of systems 201 operate completely unstaffed for a given site in the airport. The system 201 allows the user 204 to proceed to the sterile portion of the airport if the self-scanning is successful but informs the user 204 to exit and retry and/or get assistance in scanning at a staffed site in the airport, if the self-scanning is unsuccessful.

Figure 3:
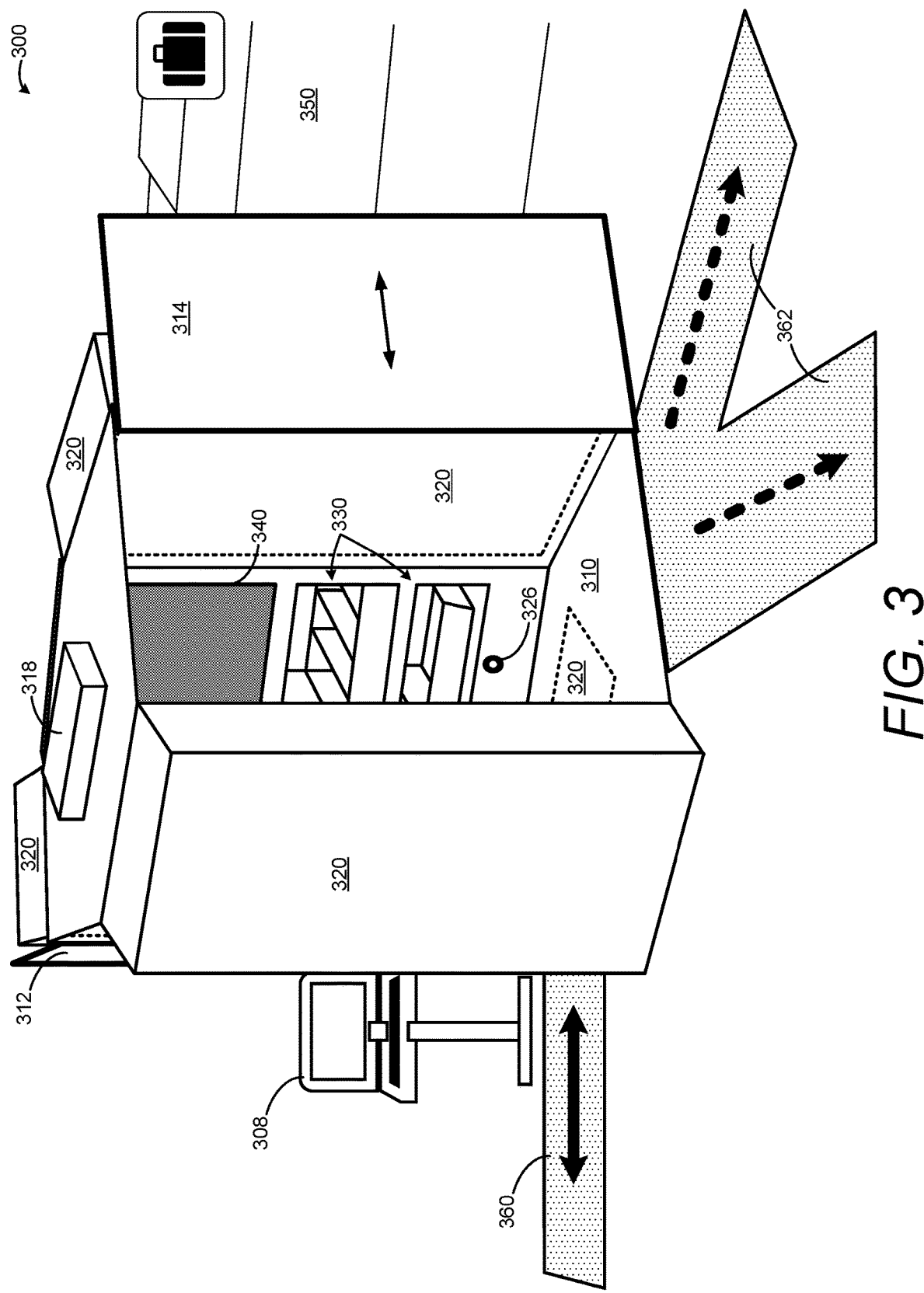
FIG. 3 illustrates a screening system including a divestment interface according to an example embodiment.
Figure 4A:
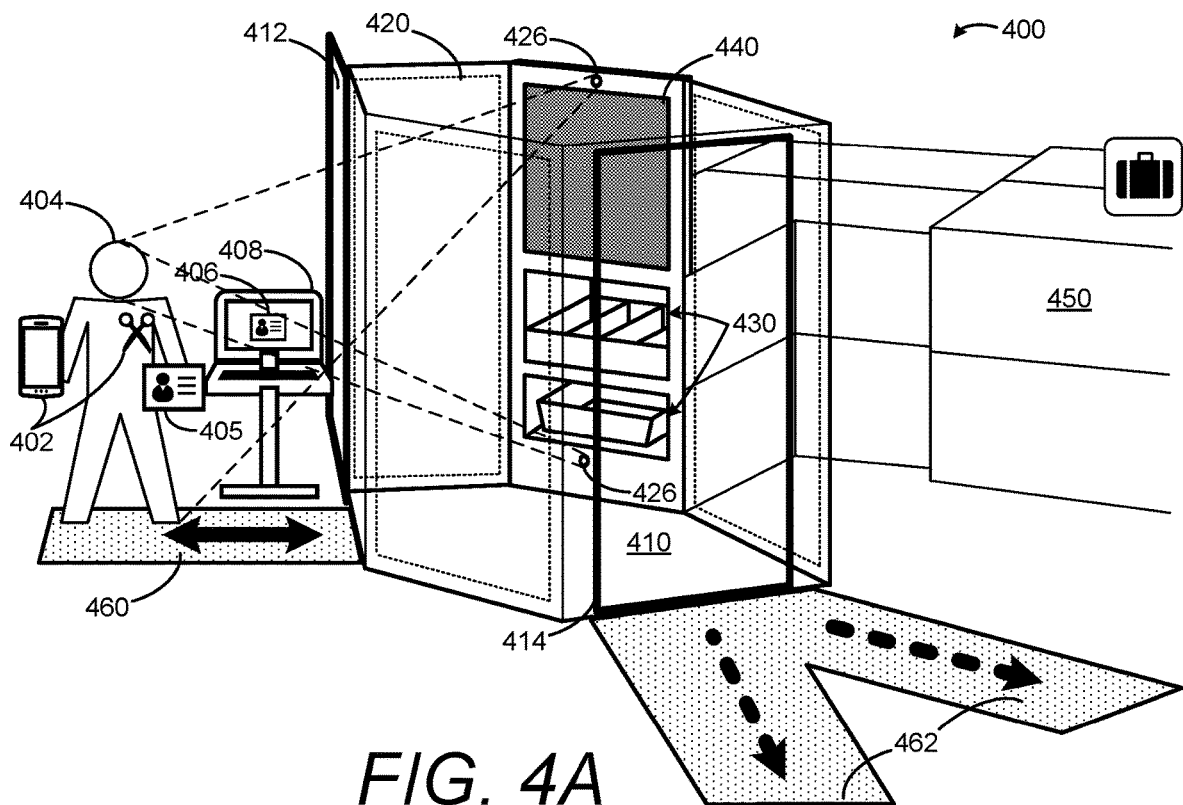
FIGS. 4A-4G illustrate an example operation of a screening system including a divestment interface according to an example embodiment.
Figure 4B:
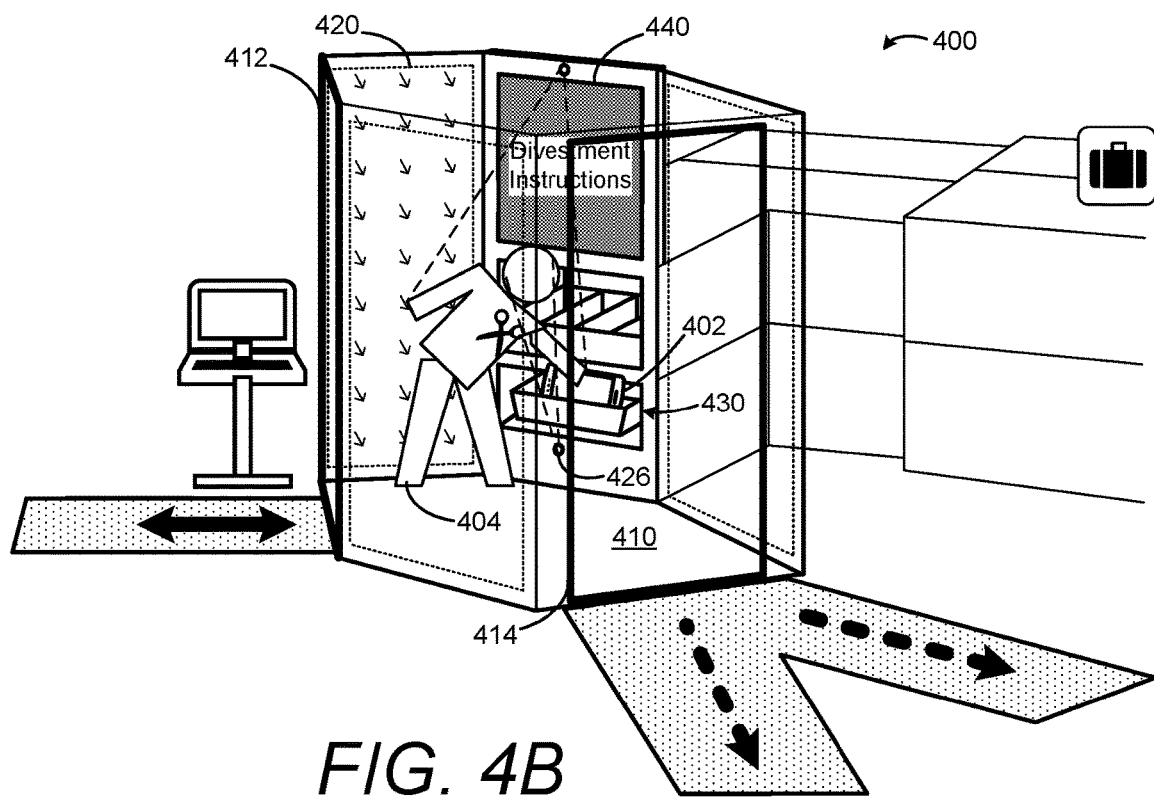
Figure 4C:
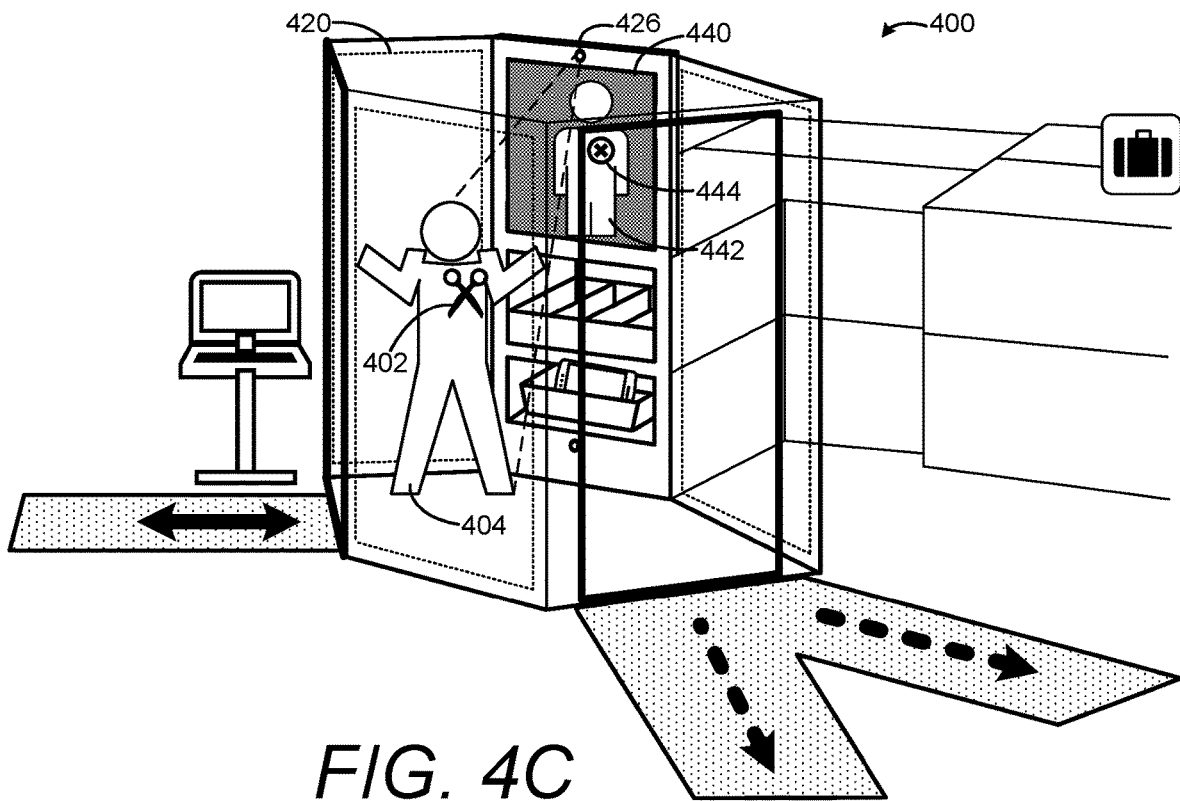
Figure 4D:
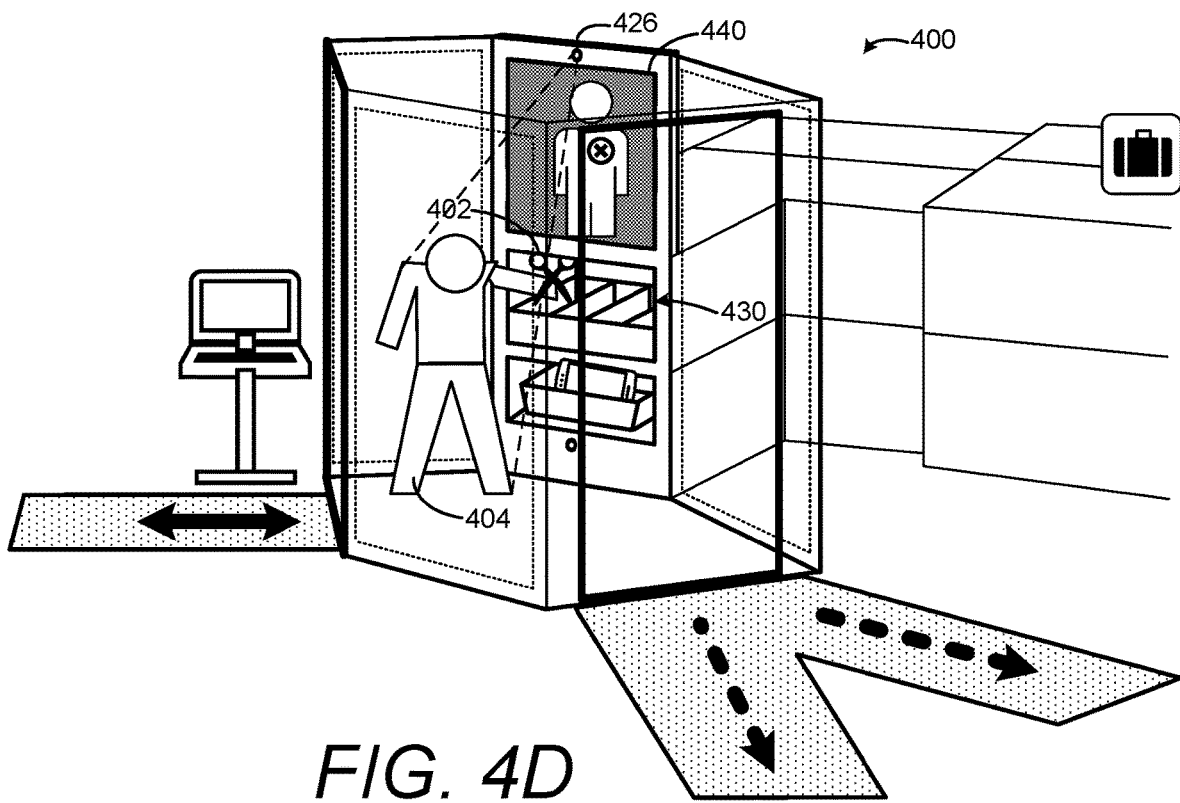

During operation of an example embodiment, the system 201 determines that the user 204 has fully divested from their person (e.g., see FIG. 4D). The system 201 allows the user 204 to insert their items 202 into the divestment scanner 250. The system 201 then scans the items 202, automatically searching for prohibited objects among the items 202 (e.g., sharp objects, weapons, etc.). If a prohibited object is identified or alarmed, an example embodiment of the system 201 returns the prohibited object to the user 204, and relays information about the detected prohibited object and its location in the user's property. For example, the system 201 displays an abstract representation of the user's carry-on luggage on an engagement monitor, such as the user interface 340 shown in FIG. 3, along with an icon overlaid on the luggage representation, with a label such as "prohibited object located in this area of bag," or even more specific such as "razor blade located here," "firearm located here" (a similar approach is used in embodiments to display specific locations on the user's body where items are found, and explanatory information as to why the item is prohibited). The system 201 instructs the user 204 to dispose of the prohibited object, e.g., into a divestment object drop box 225. The user 204 is free to interact with the system 201 to request assistance in finding an alarmed prohibited object detected by the system 201. An example system 201 includes drop box 225 within the chamber 210 and/or located in front of the system or checkpoint. The illustrated system 201 includes interior and exterior drop boxes 225. The user 204 resubmits themselves and/or their property for screening in the system 201. If the system 201 clears the user 204 and their property, the system 201 advances the property to the sterile side of the system (e.g., via a divestment scanner output or door 252), and/or returns the property to the user 204 inside the chamber 210, allowing the user 204 to carry the property out to a sterile side of the system 201.

If, in response to scanning the items 202 described above, the system 201 detects a high-threat object (such as a firearm and/or explosive), the system 201 holds the high-threat object internally so that the high-threat object is inaccessible to the user 204 (e.g., behind the divestment interface 230 and/or within the divestment scanner 250). The system 201 alerts and/or otherwise summons an agent or officer to take custody of the high-threat object and/or the user 204.

Embodiments provide various options for users 204 to dispose of prohibited objects that are not allowed in carry-on luggage or on-person carry. For example, system 201 identifies that the prohibited object is not a high-threat object and is otherwise permitted back in the airport or checked luggage (but not as a carry-on), and instead of opening the egress door 214, the system 201 opens ingress door 212 to allow the user 204 to exit the chamber 210 back into the unsecure area while carrying the prohibited object, passing into the non-sterile portion of the airport. The user 204 is free to check the prohibited object in checked luggage (or place the prohibited object in carry-on luggage and check the carry-on luggage as checked luggage), and then re-enter the system 201 without the prohibited object. Similarly, the user 204 is free to mail the prohibited object, place the prohibited object in a locker, leave the prohibited object with another person and/or in the user's vehicle at the parking garage, or otherwise have the freedom to dispose of the prohibited object in a manner that is permissible according to airport and other relevant rules or laws pertaining to the prohibited object. Thus, example systems 201 enable users 204 to avoid needing to forfeit the prohibited object.

An example system 201 includes a checked luggage module, to print a checked tag with relevant user information as known by the system 201 for that identified user 204. The checked luggage module enables the system 201 to directly receive the prohibited object or objects and route the objects destined for checked bags for that user/user's flight. An example system 201 notifies the user 204 (e.g., via a user interface 340) of relevant options available for disposing of the prohibited object, custom tailored in view of the type of prohibited object. For example, the system 201 notifies the user 204 whether the prohibited object must be retained inside the divestment interface 230 and/or divestment scanner 250, must be forfeited into the drop box 225, qualifies to be checked as checked luggage, qualifies to be carried out of the system 201 freely, qualifies to be received into a module of the chamber 210 appropriate for the prohibited object, or other options (e.g., based on an item library lookup of the detected characteristics of the prohibited object).

FIG. 3 illustrates a screening system 300 including a divestment interface 330 according to an example embodiment. The system 300 includes an ingress interface 308 along an ingress path 360 through ingress door 312 leading to the chamber 310. Users exit from the chamber 310 along one of a plurality of egress paths via the egress door 314, or along the ingress path 360. The egress door 314 and/or the ingress door 312 are operable to open in a manner that prevents access to the non-selected path or paths, while granting access to the selected path or paths. A chamber environmental control 318 adjusts an environment within the chamber 310. A user interface 340 provides visual and/or auditory guidance or feedback to the user in the chamber 310. An optical system 326 collects optical and other information about the user of the system 300, and a plurality of four (or more, such as including a ceiling, table, or other scanner deployment) scanners 320 collect scanner information about the user. The divestment interface 330 enables the user to divest items, which are then scanned by divestment scanner 350 coupled to the divestment interface 330. The user interface 340 disposed in the chamber is configured to prompt the user to divest undivested items. For example, the user interface 340 provides general advice to remove heavy coats prior to being scanned. The user interface 340 also provides specific divestment instructions, e.g., responsive to identifying that the user is carrying an undivested item that needs to be divested.

Prior to entering the chamber 310, the example system 300 uses ingress interface 308 to confirm passenger or user identities. Optionally, the example system may have an ingress interface 308 to determine user identities at a location that is not in the ingress path. Such an optional interface is more generally referred to in this invention as an identification interface. In another embodiment, the system 300 is integrated with other systems configured to identify the user, such as an identity verification technology or process upstream of and in network communication with the system 300 in the security screening process. The user identity established by system 300 includes pertinent passenger information, risk score information, and other relevant scanning information. In embodiments, the user identity includes information obtained by the system 300, as well as information that is relayed to the system 300 from other systems (including other system located onsite with the system 300, or externally, such as remotely located identification services, or government agencies such as the Department of Motor Vehicles). Embodiments also obtain information from documents carried by the user, such as a passport or driver's license. Example embodiments also determine whether the user is an unscheduled walk-up (directing the user to wait, giving priority access to the chamber 310 to prescheduled users, and/or keeping a threshold number of chambers 310 unoccupied or available corresponding to a number of expected prescheduled users during a given window of time), or whether the user is prescheduled for a particular screening location or time (giving the user priority access over walk-up users). It will be understood that the exact identity of a user need not be fully determined to be useful. For example, as discussed more specifically below, the user's gestures or gait may identify the user as a threat without fully identifying the user. Such a system may be necessary where a user fails to provide his government issued identification to the identification interface or where the interface has an unresolved error in scanning the identification.

Embodiments of the system 300 adjust detection criteria and security screening procedures to be applied to a given user or passenger as he or she enters the system, e.g., pursuant to an assigned risk score. Divestiture instructions, concept of operation parameters, detection algorithms, and other aspects of the scanning procedure are varied based on the user's profile and risk information. The deployed scanning detection technologies 320 enable the system 300 to make material discrimination and object recognition assessments to determine the presence of everyday or innocuous items. The system 300 also makes a risked-based determination on whether a passenger or user needs to divest an identified property item (e.g., based on whether the item is recognized and whitelisted, unrecognized, recognized and blacklisted, recognized and compatible or incompatible with the user's risk score, and so on). Additionally, embodiments of the system 300 vary security screening parameters to maintain a dynamically variable screening environment, which changes on a random and continual basis as desired, e.g., to thwart bad actors by preventing them from recognizing an emergence of patterns of scanning procedures. Thus, example systems introduce pseudo-random variations into the procedures, even on an automatic basis.

Example embodiments of system 300 also adjust the information displayed on the user interface 340, e.g., a passenger engagement display and audio system. Such user instructions and guidance are based on known user characteristics, which are provided by the passenger or obtained from other sources, including the user's preferred language or disability information. The system 300 also infers such information to perform scanning procedure customizations, e.g., based on information the user provided during an airline reservation or identity verification process (which may have occurred even days before the user's scan at system 300). Such inferred customization information includes primary language or languages used in the issuing country of the passenger's identification, and the like. The system also customizes the screening processes and technologies applied based on known disabilities of the passenger or user, such as limb amputation, and/or sight or hearing/mobility limitations. Embodiments of the system 300 directly observe and identify such user features based on the use of optical system 326. Examples of system 300 apply modifications to enable accessibility for individuals such as children or individuals with disabilities that need assistance through the screening process, and/or who utilize mobility aids (such as wheel chairs or scooters). System 300 is capable of summoning an agent (via external indicators, communications, or other example techniques as described herein) to aid or otherwise facilitate accessibility of individuals, and in the case of unstaffed systems 300, can direct the user to another system location that is staffed. Thus, system 300 provides a custom-tailored screening experience, capable of varying procedures for each passenger or user, thereby maximizing the effectiveness and ease of the security process.

The system 300 also provides enhanced care for a user's items, such as carry-on property. The system 300 is configured to internally hold a user's property, preventing other individuals from accessing the user's items while the user is inside the chamber 310 (e.g., until such time as the passenger is cleared and ready to collect their items). Furthermore, the system 300 holds or diverts alarming items, to prevent the items from being accessible to the user (or other users) until resolution processes are performed to clear the user. The system 300 also communicates to other systems information about scanning the user, e.g., to influence security procedures applied to other aspects related to the user, such as scanning of that user's carry-on baggage and checked baggage.

Accordingly, example embodiments of system 300 dynamically adjust an entire interconnected grouping of systems that handle the user and/or the user's items, capable of using information from one system to influence another system. The chamber 310 to scan the user adjoins the divestment interface 330 and divestment scanner 350 system, integrated to enable divested items from the chamber 310 to be directly received from the user, including larger items such as carry-on bags. The divestment interface 330 is compatible with providing and returning bins for receiving and ingesting the divested items to the divestment scanner 350. Biometric confirmation or linking an individual user to a user "session" or other identifier, enables the system 300 to keep track of that individual user without needing to retain the user's personal information. Accordingly, the system 300 identifies the user upon entry into the chamber 310, and the equipment of system 300 is calibrated to specifically scan that user to a particular threshold customized to that user's security risk score or other identity factors, which are cross-checked by an external database lookup, or assessed or determined via the system 300 itself, e.g., using video recording analytics of optical system 326, or other means to observe the user and generate a rating of a security score for the user, and/or continually update the user's security score (e.g., based on observed user characteristics such as level of perspiration, shiftiness of movement, patterns or changes to gaze direction, irregular gaits, and the like). The on-property examination is thereby linked to the user's security risk score, and a score for the user can be influenced or adjusted by an outcome of the scan of the user's items, and vice versa.

Variations in the scanning procedures for the user and/or items are also linked, such as how to instruct the user and what the user is to expect in the scanning procedure for the user and/or items, based on pre-existing info (e.g., whether the user is registered for TSA Pre-Check®). The system 300 accordingly provides suitable uniquely targeted divestment instructions for that user, compared to another user who may not share the same characteristics (e.g., users not registered for TSA Pre-Check®). The system 300 provides a high-risk user with different instructions than a low-risk user, and in an example, provides probing, bold and/or shocking instructions to purposely trigger a response from that user, and check for types of changes in the user (e.g., sweat, heart rate, or other changes in behavior, movement, concealing of items, and so on) as confirmation or disconfirmation of a risk that can be inferred from the shocking instructions.

Examples of system 300 selectively apply and combine scanning technologies differently, depending on a risk score of the user to be scanned. The system 300 obtains the risk score in various ways, including the use of biometrics (biometric key or independent assessment) and/or a scan and check of user identification provided at the ingress interface 308. In an example, the system 300 evaluates a risk score along a spectrum of scores, and then categorized a given user's score as being a high, medium, or low risk score. For users having a low risk score, the system 300 is more lenient and increases its ability to place less weight on, or even disregard, an indication that has a likelihood of being a false alarm. In contrast, for a user with a medium or high security risk score, the system 300 does not disregard, and places more weight on, any alarms for that user (e.g., even if the alarm has a 90% likelihood of being a false alarm). The system 300 adjusts accordingly in view of the security risk score based on the user identity, placing different weight on even the same type of alarms for various items in view of the user's risk score, to allow one user to pass with a given item, while holding another user (or directing the user to secondary screening) for that same item, even if triggering the same alarm, whether it be a legitimate or a false alarm.

The example ingress door 312 and the egress door 314 of system 300 are illustrated as automated entry/exit sliding doors. Other types of swinging, folding, hinged, rotating, or other technology doors are compatible with system 300, and in some open embodiments, the doors are omitted (whereby notifications or lighted indicators serve to selectively guide users). Automated doors enable the system 300 to selectively allow or deny physical access to the chamber 310, e.g., on a per-user basis. In an example embodiment, prior to a scan, the system 300 validates whether the user is permitted into the chamber 310, and also validates whether the user is permitted to exit the chamber 310 to proceed to a secure area, e.g., along egress paths 362 and/or to an area beyond the system 300, prior to opening. For embodiments without doors, the system 300 exercises influence over the user by selectively activating or deactivating various aspects of itself, such as the ingress interface 308, the user interface 340, the divestment interface 330, selectively illuminated arrows, and other indicators that can remain dormant or activate, and/or provide instructions such as "access denied see agent" or the like. Example embodiments of system 300 including doors are able to maintain positive control of a user, e.g., physically denying entry into the chamber 310 until access is granted, and/or physically denying exit from the chamber 310 until an alarm or alarms is resolved or an agent is ready to take control of the user upon exit from the chamber 310, e.g., for escorting the user to and/or applying enhanced screening and/or further resolution processes for the user. The system 300 is configured to direct the user to a selected one of a plurality of different egress paths 362 according to a result of the scan of the user. For example, responsive to the scan resulting in no unresolved alarms, the system 300 directs the user along a second one of the egress paths 362 to a secure area (e.g., the airport terminals). Responsive to an unresolved alarm, the system 300 directs the user along a first one of the egress paths 362 to secondary screening, or back out along the ingress path 360 to an unsecure area (e.g., to allow the user to self-divest a prohibited item by disposing of it before returning to the chamber 310 to re-scan). In example embodiments, the egress door 314 and/or the chamber 310 are structured to physically channel the user along a particular path according to the identity and/or scan results and prevent the user from deviating from the channeled path or accessing other paths.

The chamber 310 establishes a controlled chamber environment, based on controlling various aspects including temperature, humidity, airflow, electromagnetic or other forms of radiation, sound, light, or other characteristics. An example system 300 controls the chamber environment based on construction of the chamber walls/ceilings/floors/doors, e.g., by using a wire mesh to block electromagnetic radiation, by using thermal insulation to minimize sound and/or heat transfer, by using rubber seals to prevent airflow, and so on. The example embodiment of system 300 additionally controls the chamber environment by using chamber environment control 318, such as an air filter, (de)humidifier, and/or air conditioner, to alter an environmental characteristic within the chamber 310. The system 300 controls the internal environment of chamber 310 to enable various different deployed observation/detection technologies to perform under desired or ideal conditions. For example, the chamber 310 is climate controlled to maximize the performance of scanners 320, such as those based on thermal/terahertz imaging systems. In another example, chamber 310 is climate controlled and designed to eliminate background frequencies, radiation, electromagnetic interference, and the like in the chamber 310, to maximize the performance of scanners 320, such as those based on millimeter/backscatter/Nuclear Quadrupole Resonance (NQR) detection systems. For those example chamber scanners 320 based on technology including backscatter, NQR, and/or millimeter wave scanning (for example), the chamber 310 includes a faraday cage structure to minimize or completely block external electromagnetic radiation, to provide an isolated electromagnetic (EM) spectrum environment in the chamber 310. Such environment is capable of blocking fifth-generation (5G) cell phone deployment signals, which otherwise might also impact scanning performance. In some embodiments, security scans may be timed or tuned to avoid interference from EM waves.

Example embodiments of the system 300 establish optimal temperature ranges in the chamber 310 for corresponding scanning technology used in chamber scanners 320. An example system 300 also adjusts environmental conditions in the chamber 310 in view of a condition of the user, e.g., as observed via optical system 326. Such adjustments are performed for improving user comfort, and also are performed for improving scanning performance. For example, millimeter wave scanning performance are worsened when the user is covered by perspiration. The system 300 uses the chamber environment control 318 to compensate for a user who appears with perspiration, to cool and/or dry out the user to combat perspiration. In other embodiments, the system 300 performs an initial scan using chamber scanners 320, analyzes the results, identifies poor results due to perspiration, and adjusts the chamber climate to improve scanner performance by dehumidifying, blowing, cooling, or otherwise causing the user to become more amenable to scanning. An example system 300 proactively maintains a baseline chamber climate that enhances scanning performance.

Example embodiments of chamber 310 are hardened to contain an explosion or biological threat. The chamber environment control 318 is configured to provide airflow conducive for explosive analysis, e.g., puffing air onto the user and drawing chamber air for analysis by system 300. Examples of chamber environment control 318 are configured to purge air from the chamber after one user and introduce a fresh charge of filtered air before the next user. An example chamber 310 is configured to selectively seal/lock the air inside the chamber, to contain a biohazard or other airborne item.

FIGS. 4A-4G illustrate an example operation of a screening system 400 including a divestment interface 430 according to an example embodiment. The scanning system 400 is coupled to divestment scanner 450 via the divestment interface 430. The chamber 410 is positioned to selectively enable users 404 to transition between at least one ingress path 460 and at least one egress path 462. Although not specifically shown in FIGS. 4A-4G, embodiments can include a drop box for self-divesting and/or discarding of items, external to and/or within the chamber 410 (e.g., see box 225 in FIG. 2C).

FIG. 4A illustrates a user 404 approaching the screening system 400. The user 404 approaches via the ingress path 460 to interact with the ingress interface 408 and present user identification 405, such as a passport, driver's license, identification token based on a barcode or radio-frequency identification, or similar to establish the user's identity. The user is carrying two items 402. An optical system 426 detects the user 404, and performs visual analysis of the user 404, which, in embodiments, includes facial analysis, gait analysis, and/or other visual recording/evaluation. The user interface 440 displays a welcome message, and bins at divestment interface 430 are readied for use (e.g., empty bins are automatically returned from the divestment scanner 450 via conveyor belt).

The screening system 400 is configured to, prior to scanning the user 404, establish the user identity 406 and adjust an aspect of the scan based on the user identity 406. For example, the system 400 identifies a country of origin of the user based on information available on a presented passport and determines a suitable language for verbally and visually prompting or interacting with the user to engage with the user in his/her native language during the scanning process. In another example, the system 400 identifies whether the user is unscheduled as a walk-up (directing the user to wait) or is prescheduled for this location and window of time (directing the user to proceed to chamber 410 which the system 400 has kept unoccupied in anticipation of the prescheduled user). In another example, the system 400 is unstaffed and identifies that the user 404 will need assistance from an agent and directs the user 404 to another screening location that is staffed, prior to the user 404 being scanned. The ingress interface 408 includes a reading device to scan the user identification 405. In other examples, the ingress interface 408 allows voice entry, or collection of other user identifying information such as data entry typing of passwords or biometric collection (fingerprints, retina scan, facial recognition), and the ingress interface 408 delivers a passenger identification such as a barcode or other token to serve as user identification throughout the scanning process (e.g., a passenger identity token). The screening system 400 uses optical system 426, or retrieves information from available identity databases, to identify specific user information of possible missing body parts or specific security screening sensitivities, which are used to optimize and enhance the detection process (e.g., generate specific user prompts and guidance to assist in scanning an artificial limb or mobility device, inquire whether the user desires agent assistance, and the like). Thus, system 400 is capable of anticipating the user's preferred language based on user identity, and further customizing the scanning process by adjusting various aspects of guiding the user, breaking down instructions into simpler steps, or combining steps for more complex but faster dissemination of user instructions, and the like. System 400 learns personal physical limitations of the passenger, such as blindness or deafness, to dynamically customize the user instructions to accommodate such user aspects and make the scanning process easier for the passenger (e.g., increase a font size of displayed instructions, increase volume level of the instructions, provide audio instructions to accompany visual instructions, etc.) and efficiently process the user according to a truly customized experience for each user, based on risk score and known personal characteristics. Additionally, aspects of the scan are dynamically adjusted for the sake of creating variation in the scanning process, thereby avoiding a predictable repetitious procedure to introduce a randomness element and prevent bad actors from learning patterns or other details of the scanning procedure in an attempt to try to evade aspects of the scan.

In an example, an embodiment of system 400 establishes a biometric key (e.g., a passenger identity token) agnostic to the user's personal info to serve as user identifier. The established biometric key is unique to at least one biometric indicator of the user and contains risk information and security risk assessment information for that user. Accordingly, the example system 400 avoids needing to store sensitive identification user information into the user identifier in order to uniquely identify the user in the scanning process. For example, the optical system 426 obtains a facial scan and/or retina scan of the user 404, and the ingress interface 408 obtains a fingerprint and/or palm scan to validate the user's identity. System 400 accesses risk information corresponding to the validated user identity, and ties that established risk information to the secure biometric token serving as the user's identity identifier and discards personal information of the user.

Example systems 400 access a risk database, such as the Transportation Security Administration (TSA) Secure Flight Program or other risk database, to implement Risk Based Security (RBS) approaches to user screening methodologies, improving the effectiveness and efficiency of airport security operations. System 400 adjusts, based on user risk score, detection algorithms used by the system 400 to analyze results of chamber scanners 420 (based on, e.g., advanced imaging technology (AIT)/X-Ray/computed tomography (CT)/etc.). In an embodiment, the system 400 makes these adjustments to the entire system (e.g., adjusts the characteristics of the scan of the user, and the characteristics of the scan of the on-person/carry-on bags or other items) corresponding to or otherwise associated with the user. In an example, the system 400 obtains risk information from another upstream security system (e.g., relayed to the system 400 via an encrypted biometric token), and/or independently establishes a user's identity and corresponding risk information through the use of biometric matching to a "ground truth" identity database (such as that provided by the Department of Homeland Security (DHS)/Department of Motor Vehicles (DMV)/etc.). The system 400 additionally can make changes to what kind of screening is generally applied to the user 404, based on the user's risk score. Furthermore, the system 400 similarly applies a variable security level of holding the user, corresponding to the risk score of the user. For example, the system 400 closes and secures the doors using a deadbolt to prevent high-risk users from physically escaping from the chamber 410. In contrast, the system 400 can leave doors open and merely use directional instructions displayed on user interface 440 (or other indicator, such as illuminated floor/wall arrows) to provide helpful guidance for a low-risk user (e.g., a user already approved by TSA Pre-Check®). Example systems 400 also access the databases and other systems to determine whether a given user has prescheduled (e.g., in conjunction with making flight reservations) for a particular location and/or window of time for arriving at the system 400, such as by communicating with a flight reservation system. Example systems 400 use such prescheduling information to identify and prepare for expected traffic, e.g., by adjusting how long to instruct walk-up user to wait, how long to hold open a given chamber or chambers for expected prescheduled users, and/or what percentage of chambers in a given system to hold open, i.e., how much slack-space to create in the system in order to accommodate surges or other variations in user traffic.

Example embodiments of system 400 dynamically adjust scanning and instructing the user 404 on a per-user basis, providing a granular, individualized level of screening experience. An example embodiment provides discrete buckets or sets of scanning procedures (e.g., a given bucket or procedure set may include the procedure of instructing the user to remove shoes, or the like) in which the system classifies users, and then applying that user's corresponding procedure set, of a particular combination or combinations of scanning strategies, guidance, operation of system 400. Any number of discrete procedure sets can be employed, to adjust for different body morphologies (e.g., different scanning procedure sets for given body types or attire, or whatever other factors) and system performance variation based on known body features/characteristics. Similarly, gender may be important for determining the precise detection algorithms to be used for a particular user. An embodiment associates a given procedure set with an independent risk calculation for that user, how well the system 400 is capable of screening that user, and how much risk is associated with that user, and dynamically adjusts the risk level of the user in view of the applicable procedure set. Such discrete procedure set approaches are combinable with variably adjustable features in any given embodiment, e.g., using a grouping of instructional procedures, while including an infinitely variable application of scanning intensity. Embodiments take into account the known disabilities of users, and whether that impacts the user's risk calculation and/or how to approach the user's scanning, whether to screen the user in a different manner based on that known disability, whether the user has a prosthetic, whether to add some particular divestment steps or instructions, whether to target the scanning of the user more on explosive detection versus user's surface-based details, whether to focus more on surface-based details, or other features that are adjustable on a per-user basis. Example systems account for items the user discloses to the system and which are vetted as acceptable for screening, as well as accounting for items that are known by the system to be associated with the disability or other user information. For example, the user notifies the system of a walking impairment, and the system allows the user to proceed carrying crutches, which are known by the system to be associated with a walking impairment (even though the user did not specifically inform the system of crutches). Example systems include libraries of items known to correspond to known disabilities or other characteristics of users. In the above example, the system also knows to allow a wheelchair, for example, in addition to allowing crutches, accommodating users with walking impairments regardless of what type of items are used to assist the user with walking impairment.

Known disabilities, country of origin, languages spoken, body morphology, security risk information, risk score, known past crimes, gender, gait evaluation, and facial expression detection are examples of relevant scanning information that may dynamically change an aspect of the scan including instructions, scanning thresholds, and white listed and black listed items.

Thus, the system 400 is capable of varying the instructions to accommodate a user 404, and also is capable of varying the scanning strategy and/or technology deployed to accommodate that user, resulting in synergistic effects in view of the available types of scanning technology deployed in the system 400, e.g., installed at scanners 420. For example, system 400 can include, or adjust, the screening applied, e.g., as applied by various different discrete procedure sets applied to users, or as variably adjusted per user, to accommodate the types of scanning technology available in that example system 400. Example systems 400 include a modularized implementation, to accommodate modularized changes or the addition/removal of modules of scanning technology, which enables the system 400 to modify and/or create new procedure sets for accommodating different users. The system 400 analyzes scanning usage patterns, and calculates how much time could be saved by the system 400 based on which available scanning modules are used, including a suggestion to add new modules. The system 400 similarly calculates what synergistic scanning effects can be leveraged based on existing installed scanning technology, and in view of what scanning technology/modules can be added.

Example system 400 leverages synergistic scanning, by which different scanning technologies are applied to provide an enhanced overall scanning effect. A given type of scanning technology is deployable by system 400 in multiple scanning modes, depending on what needs are being met or which procedure set is being applied for scanning a given user. For example, a millimeter (mm) wave scanner 420 is operable in a reflective mode, whereby a scanner 420 emits a mm wave pulse that is reflected by the user or other object back to that panel (multiple panels are usable emit and/or receive). The backscatter x-ray scanner 420 is also operable in a pass-through mode, in which a stronger signal is emitted from one panel, to pass through the user and be received at another panel (revealing details beyond a surface of the user). Radiation used for either mode is similar, and one mode is usable for external scanning, and the other mode for internal scanning, using the same scanner technology. The different operational modes are enabled by the structural configuration of the chamber 410 and the arrangement of the scanners 420 deployed at the system 400. Accordingly, the same scanner technology is usable in different modes according to a given user, e.g., to probe whether a high-risk passenger is carrying concealed explosives, to accommodating medical devices of a user based on medical profile information, or other customization information as determined by the system 400 based on user information such as risk score and/or identity. Based on such information, the system 400 adjusts the application and combination of scanning technology to be used for scanning the user, to ensure needed scanning information is obtained, while avoiding any potential negative outcomes or medical conflicts, in a fast scanning experience that is transparent to the user.

The screening system 400 is configured to update the user's identity based on the scan. For example, the screening system 400 uses optical system 426 to perform facial recognition to determine that the user 404 has a particular style of facial hair and a new tattoo. Accordingly, the system 400 updates a database of the user's identity information to include facial hair and tattoo identity information details.

Figure 6:
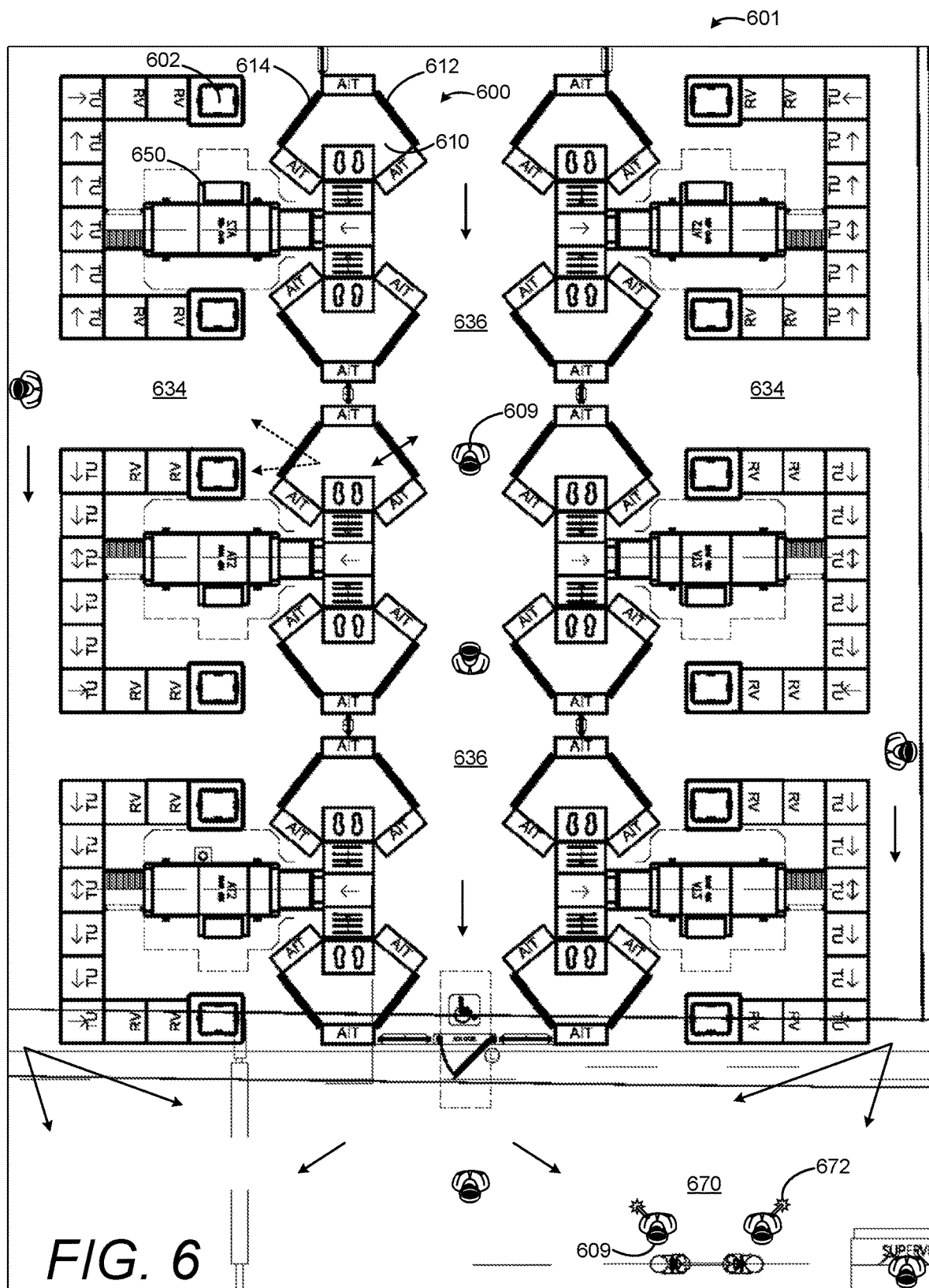
FIG. 6 illustrates a system layout including a plurality of screening systems and divestment scanners according to an example embodiment.

Example embodiments of the screening system 400 are also configured to communicate a result of screening the user to other systems, such as a central data repository, a secondary screening system, and so on. For example, the system 400 transmits scanning results from the system 400 to a secondary screening area, such as a screening area with agents using pat-down or hand-held wands. Example embodiments of the system 400 are communicatively linked to stations/resolution tools at the secondary screening resolution area, including a direct communication to the hand-held millimeter wave (HHMW) scanners/wands. An example secondary screening area is shown in FIG. 6, secondary screening 670. The HHMW is usable to conduct secondary screening under the direction and advice of the system 400, as communicated to the HHMW, e.g., to direct focus to areas of the user that alarmed the primary scanner 420 in the system 400. In an example, the system 400 identifies a specific area of the user as triggering an alarm, such as the upper left torso, and communicates that specific area information to the secondary screening so that an agent can focus the secondary screening to resolve the issue at the specific area of the user's body (see FIGS. 4C and 4D for more details). During the alarm resolution process, an agent can receive the alarm information from the system 400, and request the additional divestment of alarmed areas and then, if items are removed, confirm that these areas are clear through the use of the HHMW unit (reducing or eliminating the need for physical pat-downs). Additionally, the system 400 is configured to communicate to other systems, including those that do not directly scan the user. For example, other systems, even those remotely located, which might scan user's carry-on and/or checked luggage, in addition to the divestment scanner 450.

The system 400 is capable of performing scans including the use of a real-time video analytics system, e.g., based on optical system 426, configured to identify an indicator of the user (such as type of gait, facial recognition, body movements, missing/artificial body parts, and the like), and adjust the scan according to the indicator. In addition to the scanners 420 and detection systems deployed for screening the user's person, the real-time video analytics technologies are configured to assess the user's movements in the chamber 410 of the system 400. Accordingly, the system 400 monitors user movements (via optical system 426) and triggers various security scans (via scanner or scanners 420) as the user is appropriately positioned to be scanned. Thus, system 400 interprets user movement and non-verbal communication to better engage with the user, and ensures that the passenger does not try to "game," cheat, or otherwise attempt to circumvent security screening systems and procedures. The system 400 applies real-time video analytics to enable behavioral/biological indicator monitoring of the user 404, including body language/non-verbal cues, micro facial expressions, heart rate patterns/variations that system 400 uses to identify abnormalities correlated with deception or hostile intent, which the system 400 factors into screening assessments and/or axillary risk indicators/scoring.

Embodiments of system 400 implement video analytics using human operators, artificial intelligence (AI), and/or deep learning algorithms, which system 400 trains and improves based on real-world usage (e.g., where an agent provides positive or negative reinforcement, or multiple systems are configured to provide feedback/reinforcement to each other). Such training includes teaching the system 400 how to identify behavioral indicators, e.g., based on subconscious body language movements, micro-aggressions, irregular gaits, thermal imaging of heart rate, and the like. Example systems 400 treat such behavioral and other analyses as auxiliary threat indicators, taken into consideration by the system 400 in conjunction with other security risk score or scanner/video analytic information, to provide a well-rounded combination of various factors to indicate a threat/risk score for the user 404. An embodiment of system 400 implements audio or visual aspects of the user interface 440 to probe the user 404 with a pressing/shocking question, to trigger feedback behavior in the user 404. For example, the system 400 asks the user 404 directly whether the user is in possession of a gun or explosive, to monitor the user's reaction for getting nervous or otherwise incites a biological reaction from the user 404 (perspiration, heart rate) that is consistent with guilt or deception, and thereby incorporated into the user's overall risk score, or even triggering an alarm.

Example embodiments of the chamber 410 are configured to cause the user 404, while entering, advancing through, and/or exiting the chamber 410, to assume at least one scanning position for a sufficient scanning duration. The chamber 410 is configured to automatically initiate a scan via one or more scanners 420 appropriate for the automatically detected scanning position, in response to automatically detecting that the user 404 has assumed the scanning position (e.g., based on optical system 426, scanners 420, interaction with the ingress/egress door or doors 412/414, and/or interaction with the divestment interface 430. In an example automated scan initiation, the system 400 tracks the user 404 through the use of optical/thermal systems 426, automatically initiating one or more scans when the user 404 is appropriately positioned. Such scans by system 400 are targeted, continual, and/or opportunistic, taking advantage of a user's natural movements to achieve automated scan initiation, continual scanning, and/or targeted placement of millimeter wave scan technologies, during divestiture and the loading of carry-on property into the divestment interface, to partly or completely screen a user's person.

In an example embodiment, once the passenger enters the system 400, the system 400 is configured to enable the natural movements and time spent by the user during the divestment process to allow the system 400 to capture scan data and conduct automated analysis of the user 404. Such movements, which are leveraged to generate scan data, include but are not limited to: walking into the chamber 410; turning to face the ingress interface 408, user interface 440, and/or divestment interface 430; bending to remove footwear as appropriate/directed; lifting of arms to remove jackets/sweaters as appropriate/directed; and lifting of carry-on baggage or other items into the divestment interface 430 and/or other property screening systems such as a table or divestment scanner 450.

Aspects of the example system 400 are designed and configured to ensure that a user completes the necessary range of motion and spends the required amount of time in the system 400 to capture sufficient scan data to make an accurate assessment. Such design and configuration aspects include but are not limited to: total distance/angle of approach from chamber entrance to a table or an upper interface section located at the divestment interface 430; height of the divestment table/receptacle; height of a bin return system (e.g., a lower interface section) of the divestment interface 430; and placement of the user interface 440 (e.g., display monitors to direct the user's line of sight/gaze). If the system 400 is unable to scan/capture a specific area of the user's body during the divestment process, the system 400 can instruct the passenger to assume a specific pose or poses (see FIG. 4E) to obtain sufficient scanning information and ensure minimal unnecessary alarms resulting from insufficient data. In an example, the divestment interface 430 includes a door mechanism having two handles, which the user 404 is directed to hold in order to activate the door mechanism using both hands while assuming a desirable scan position as well as a desirable range of motion in the user when moving the two handles to operate the door mechanism.

An example system 400 initiates scans and achieves user tracking automatically using video analytics by the system 400 analyzing video feed from optical system 426 to identify an identity of the user 404, and their body posture/limb position, to build a motion wireframe for tracking and comparing against a dynamically learned/updated database of wireframe body positions that are known to be suitable for a given type of scan. Systems 400 can incorporate motion capture and movement of clothing in real time, and the identification and scanning of surface/shallow blood vessels. Accordingly, for example, if the user reaches up to divest their carry-on bag, the system 400 scans the user's stomach area and underarms. If the user reaches down to untie shoes, the system 400 scans the user's back, and so on. The chamber 410 is physically structured and configured, based on the scanners 420, divestment interface 430, and so on, to cause the user 404 to be particularly positioned relative to the panels of the scanner 420, the optical system 426, or other system equipment, to achieve a synergy with the positioning and natural usage of the divestment interface 430, including the accomplishment of a pre-orchestrated range of motions which the physical structure/environment of the system 400 is set up to necessitate. The system 400 prompts the user 404 to remove clothing/items, and checks if the user 404 has complied. The system 400 monitors whether the user does something unusual, such as dropping an item onto the floor (e.g., the system ensures that nothing is on the floor via checking for changes in the video capture corresponding to the floor area), and tracking whether the user 404 performs the requested actions, and does not disobey instructions or perform unrelated actions (unbuckling pants and reaching behind toward a body cavity, attempting to break into an in-chamber drop box, and the like). Thus, the system 400 gives a simple instruction (via user interface 440) such as "place cell phone in box #3," and the user 404 reaches up a certain way to position their body specifically for a scanner relative to the body position and location of that divestiture box #3, to achieve effortless and quick scanning of the user 404. Such scanning is also accomplished without specifically directing the passenger to assume a given position, by allowing the user to self-divest certain items while the system 400 accomplishes the scanning on-the-fly while the user divests, according to the posing and other divesting instructions that are seemingly unrelated to the user assuming a position for scanning. Accordingly, the user 404 enjoys a more pleasing and non-intrusive scanning experience.

FIG. 4B illustrates the screening system 400 with user 404 inside the chamber 410 with ingress door 412 and egress door 414 closed. The user 404 is divesting item 402 into a bin at the divestment interface 430, but has forgotten another item (scissors) in a breast pocket. The user 404 has naturally positioned his/her face close to lower optical system 426, and has naturally positioned his/her body toward panel scanner 420. The user interface 440 is presenting divestment instructions (visually and/or audibly).

As illustrated, the divestment interface 430 is configured to cause the user 404, while divesting the item 402, to assume a scanning position for a scanning duration, and the chamber scanner 420 is configured to automatically scan the user 404 in response to detecting (via optical system 426 and/or sensing by scanner 420) that the user 404 has assumed the scanning position.

In an example embodiment, the chamber scanner 420 includes multiple different scanning technologies configured to perform a cross-detection system analysis scan, based on scanning technologies such as AIT/X-Ray/CT/etc. The system 400 uses multiple detection technologies to perform the cross-detection system analysis of the user 404, by having the various system scanning technologies compensate for any individual shortfalls of a given technology. For example, millimeter wave scanning technology achieves high resolution, while being prone to false alarms due to user sweatiness or certain types of clothing. Accordingly, the system 400 cross-references the millimeter wave scanning technology with a thermal or terahertz scanner (which has a lower detection resolution, but has good performance for larger-scale items regardless of sweat or clothing), using those complementary technologies to enable the system 400 to self-verify a false alarm from a given one of the technologies, by referring to the other technology/technologies. The system 400 also influences the cross-referencing and/or combining of multiple different types of scanning with the user's risk score, to further evaluate how to weight different scanning technologies to address a given likelihood of false alarms associated with a given scanning technology and a combination of different scanning technologies. For example, the system 400 deploys nuclear resonance scanning and dielectric scanning systems, which have vulnerabilities and/or difficulties regarding metals, while combining those technologies with metal detecting scanning technology, combine the different detection/scanning technologies to leverage the advantages of each. The modularized scanning system approach used in example systems 400 enable different combinations or subsets of technology to be used, to address the scanning goals for a given deployment of the system 400. The system 400 handles the operation of the various different types of technology, freeing up personnel to address resolution of alarms, without needing to concentrate on, e.g., machine/technology operation. The system 400 is automated and handles directing the user 404 onward to the airport or to further screening/pat down resolution areas, enabling the user 404 to self-resolve by using the divestment interface 430.

Example systems 400 take the results of the various scanning technologies to make security determinations based on a totality of scanning results, factoring the known vulnerabilities and/or strengths of the incorporated detection/scanning systems, and/or the user's risk score. Detection/scanning technologies can be deployed into the walls, floor, ceiling, tables, and other surfaces of the system 400 as needed. Security screening technologies that can be incorporated into system 400 include, but are not limited to: millimeter (mm) wave scanners; backscatter X-ray scanners; nuclear quadrupole resonance (NQR) scanners; dielectrometry systems; metal detection systems; terahertz imaging systems; thermal imaging systems; explosive trace/odor detection via airflow sampling; and/or future on-person screening technologies. The totality of incorporated security screening technologies provides the system 400 the ability to function under a wide range of operational parameters, from low-risk users 404 who are allowed to keep footwear/outerwear on through the screening process, to high-risk users 404 that trigger a more detailed assessment under fully-divested conditions. In yet another embodiment, the above technologies and others are combined with thermal/polarized thermal/other passive imaging technologies and mm wave AIT for false alarm reduction and improved detection. By pairing the thermal imaging (or other imaging systems) with AIT technologies, system 400 reduces certain "false" alarms (clothing embellishments, sweat, etc.) to which some AIT systems are prone, while also potentially improving detection though cross-assessment of users 404 through a multitude of scanning technologies.

FIG. 4C illustrates the screening system 400 in an alarm state following the detection of the forgotten scissors item 402 carried in the user's breast pocket, the detection based on the automated scan shown in FIG. 4B. The user 404 had been unaware of the presence of item 402, but the user interface 440 is configured to display a body representation 442 of the user 404 overlaid with an item indication 444 of the undivested item 402 positioned corresponding to the undivested item's location on the user's person. Accordingly, the user 404 is able to self-locate and self-resolve the alarm state, even after forgetting the presence of the item and otherwise insisting by the user that no items were carried that needed to be divested. Furthermore, embodiments of the system 400 provide explanatory information on the type of item 402 and why it is prohibited or otherwise needs to be divested. Such explanatory information, e.g., instructs the user to temporarily divest the item that is otherwise not prohibited and allowed to be carried by the user to the secure area after resolving an anomaly with the item, or instructs the user to surrender the prohibited item which cannot be carried into the secure area. In an example, the system 400 explains to the user that a detected beverage item is prohibited, but the user is free to drink or otherwise dispose of the beverage before being re-scanned and allowed to proceed to the secure area without the beverage. The system 400 also can provide explanatory information relating to dangerous/hazardous/unlawful items that require holding the user to be taken into custody by agents.

The user interface 440 facilitates a guided user alarm resolution. The system 400 displays or otherwise relays alarm information to the user 404, visually and/or audibly, to direct additional divestiture/rescanning of the user 404 to resolve alarm conditions without need for agent involvement (when practical/safe). For instance, responsive to the system 400 detecting an item 402 in the user's pocket during a scan, the system 400 advises via the user interface 440 that the user 404 is carrying an item, and directs the user 404 to perform additional divestment of that area of the user's body. The system 400 then automatically directs the user 404 to remove/divest any items from that area of the user's person, allowing the system to perform further X-Ray/CT screening of the item, direct the user 404 to be rescanned, and (barring additional unresolved alarms) enable the user 404 to be subsequently and automatically cleared. In an example, the system 400 identifies that an item is prohibited, and allows the user 404 to discard the item in a drop box, exit the chamber via the ingress path to self-divest in an unsecure area upstream of the chamber, or prompt the user to acknowledge that the divestment interface 430 will confiscate the item if divested into the divestment interface.

Embodiments of the system 400 visually and/or audibly advise the user to move and/or get into position for better scanning, as well as perform unannounced opportunistic scanning without specifically notifying the user 404. System 400 leverages the divestment instructions, and deploys bold or prompting questions, including questions that serve multiple purposes such as getting the user 404 into appropriate position for scanning, or eliciting a user response while observing how the user 404 responds. As illustrated in FIG. 4C, the system 400 has provided an alarm question about carrying a sharp weapon, which elicits a shrugging response by the user 404, which the optical system 426 detects and identifies consistent with a non-threatening situation in which the user has merely forgotten he/she was carrying scissors.

FIG. 4D illustrates the screening system 400 holding user 404, who is divesting item 402 into the divestment interface 430. The system 400 has detected the anomaly caused by item 402 carried by the user 404 (see scan depicted in FIG. 4B), and has informed the user 404 of the alarm location and has instructed the user 404 to perform additional divestment or divestments of the area or areas identified in the user interface 440. As the user 404 continues to divest, the system 400 is capable of repeatedly scanning the user to determine if all alarms are resolved. In the illustrated embodiment, the system 400 is waiting for detection via optical system 426 of the illustrated divestment, before re-scanning the user 404. In another example, the divestment interface 430 includes a user-operated door mechanism which the system can monitor, and/or the divestment interface 430 includes sensors to detect whether the user 404 has deposited an item into the divestment interface 430 (and similarly for divestment into a drop box, in embodiments which include an in-chamber drop box).

Figure 4E:
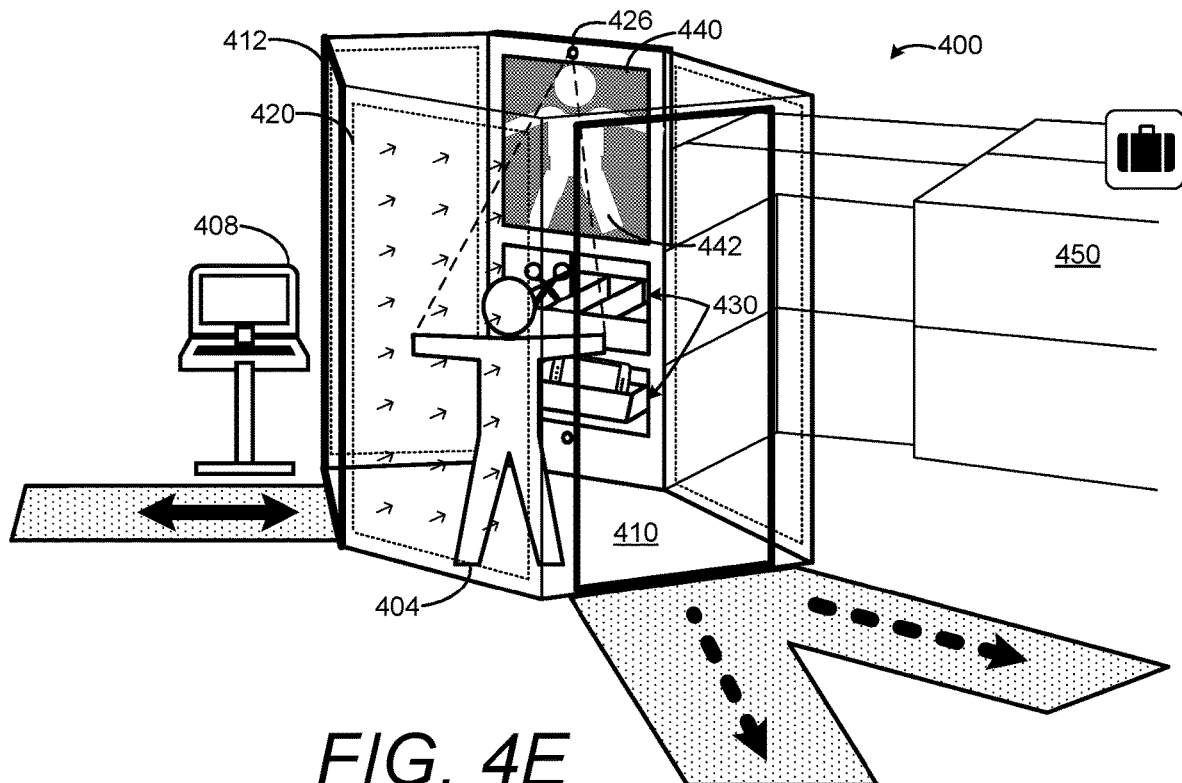

FIG. 4E illustrates the screening system 400 holding and re-scanning the user 404 following divestment. The user interface 440, responsive to identifying that scanning information is needed, is prompting the user 404 to assume a scanning position conducive to obtaining the scanning information that is needed. The system 400 is using a different one of the plurality of chamber scanners 420 to achieve the scan compared to the scanner 420 shown in FIG. 4B, based on detecting via optical system 426 that the user 404 happens to be positioned in a manner that is suitable for that scanner 420.

Within the chamber 410 of system 400, the user interface 440 is capable of offering visual/audio feedback clarifying which zones of the user 404 have been scanned, as well as the zones needing more scanning/visibility. Accordingly, the user 404 can interactively move in view of the real-time feedback, to ensure all zones are scanned to allow the system 400 to obtain sufficient scanning information to resolve alarms and/or come to a decision on a status of the user 404 (e.g., determine that directing the user 404 to secondary screening is justified, or that the user 404 may proceed onward to the airport gates). This eliminates the need for an agent to intervene for manually instructing the user 404, e.g., to assume a proper stance or adjustment to posture. Embodiments of system 400 achieve a final decision on status of the user 404 based on an accumulation of multiple detection results collected by the system 400, including scanning and other results such as behavioral analysis.

An example system 400 offers the user 404 the possibility to self-clear the alarms, and be subject to repetitive scans as needed. The example system 400 opens the entrance/ingress door 412, multiple times if needed, to allow the user 404 to perform further divesting and/or further interaction with the ingress interface 408 or unsecure areas of the security process upstream from the chamber 410 without permitting the user 404 to proceed beyond the chamber 410 to a secure area, enabling the user 404 to remove forgotten items or perform other tasks that the user 404 might need to do (retrieve a forgotten document at the ingress interface 408, etc.). A similar iterative approach is used with the system 400 allowing the user 404 to repeatedly interact with/divest to the divestment interface 430. An example system 400 limits the number of iterations, e.g., based on the user exceeding a threshold time, threshold number of iterations, or other limitation for ensuring smooth system operation (e.g., how busy or slow the security line is). The system 400 determines that a user 404 has fully divested their carry-on and on-person property (e.g., based on iterative scans and user guidance), the items are advanced to property screening, e.g., at the divestment scanner 450. In other example embodiments, a given item 402 is advanced to the divestment scanner 450 upon being divested, without waiting until additional items are divested and/or until the user 404 has fully divested.

Figure 4F:
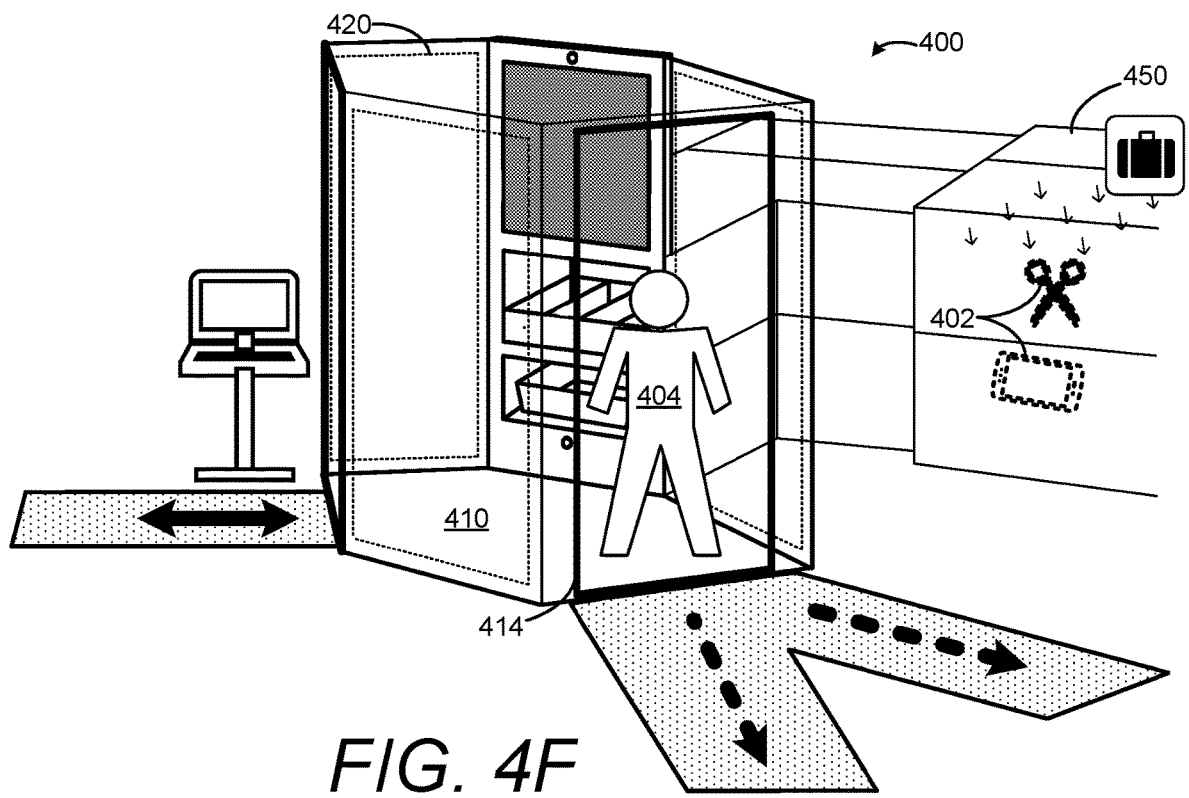

FIG. 4F illustrates the screening system 400 holding the user 404 inside the chamber 410 waiting at the egress door 414 with items 402 at the divestment scanner 450. The divestment scanner 450 is configured to obtain detailed item characterizations of the items 402 divested from the user 404. The screening system 400 is configured to update a database with the detailed item characterizations obtained by the divestment scanner 450. In example embodiments, such detailed item characterizations include instructions/guidance for informing users as to why the item is prohibited. In other examples, the system 400 uses one or more scanners 420 of the chamber 410 to perform detailed item characterizations. The illustrated example includes a conveyor belt, to convey the items into the divestment scanner 450 located away from the in-chamber divestment interface. In other examples, the divestment scanner 450 is located at the divestment interface, which also includes a door mechanism and shield to protect the user from emissions generated by the divestment scanner 450. In such examples, the items remain at the divestment interface, conveniently located for the user to open the door mechanism and retrieve the items following a successful (non-alarming) scan of the divested items. Such example embodiments allow the user to carry such allowed items from the chamber onward to secure areas beyond the egress door. Examples can selectively approve some divested items, while disallowing some divested items, which the user is free to discard (in an unsecure area and/or in a drop box) prior to being released to proceed to the secure areas carrying the approved/allowed items.

System 400 incorporates data capturing for detection algorithm updates and upgrades, from data sources local to the system 400 as well as from remote data sources. For example, the equipment at the system 400 (AIT/X-Ray/CT/ etc.) and also at a secondary screening resolution station with HHMW scanners (e.g., see secondary screening 670 of FIG. 6) capture and "tag" (e.g., categorize and associate with information based on automatic or agent-assisted scanning and/or verification) information on items 402, such as items that resulted in screening equipment alarms. An example system 400 uses that scanning information to update detection algorithm "white lists" (innocuous items) and/or "black lists" (threat items). In an example deployment of multiple chambers 410, a designated station/chamber, or other designated scanning device, is designated to serve as a scanning service that an agent uses to capture detailed information on alarming items. This designated device/station enables the scanning of an item 402 (both innocuous and threat) with a multitude of scanning technologies to obtain a detailed characterization of the item 402. The agent can provide input into the designated device/station to confirm automatically detected information and/or otherwise assist in the collection or classification of the type of information tagged to the item, or assist with other details of the item (including re-orienting the item in the designated device/station for additional scanning iterations based on feedback from the designated device/station similar to that provided to users 404 being scanned). The system 400 uses the detailed characterization information, and/or the input from the agent, to create a feedback loop for the updating of detection algorithms to reduce false alarms and/or improve detection of threat items 402 (as innocuous or dangerous). In alternate embodiments, any/all of the various chambers 410 and/or divestment scanners 450 are operable as a designated device/station, to obtain a detailed item characterization.

Such designated device/stations make use of various sensor technologies, including: millimeter wave scanners; backscatter x-ray scanners; nuclear quadrupole resonance (NQR) scanners; dielectrometry systems; metal detection systems; terahertz imaging systems; thermal imaging systems; 3D laser measurement/scanning systems; high-resolution camera systems; and/or future screening and material/dimensional characterization technologies, and the like.

In an example, after the user's property/items 402 have advanced into the property screening system such that they are no longer accessible by the user 404 (e.g., including even immediately after being ingested by the divestment interface but before arriving at the divestment scanner 450) the egress door 414 will open and allow the user to exit, e.g., to proceed to a recompose area and/or onward through the airport to recollect the items 402, or to a secondary screening area, and so on. The system 400 is also configured to prevent access by other travelers to a user's property/items 402 while the user 404 is in the chamber 410 of the system 400. Such prevention ensures that the user's property/items 402 remain under the supervision of the user 404 without providing an opportunity for another traveler to interact with those items 402 of the user 404. In an example, the items 402 are held in the secure area of the divestment scanner 450 until the user 404 is released from the chamber 410. If the user's property/items 402 alarm the screening system/divestment scanner 450, the system 400 can internally hold the alarming property until an agent responds to take control of the items 402 for further resolution, without allowing access by other travelers.

Figure 4G:
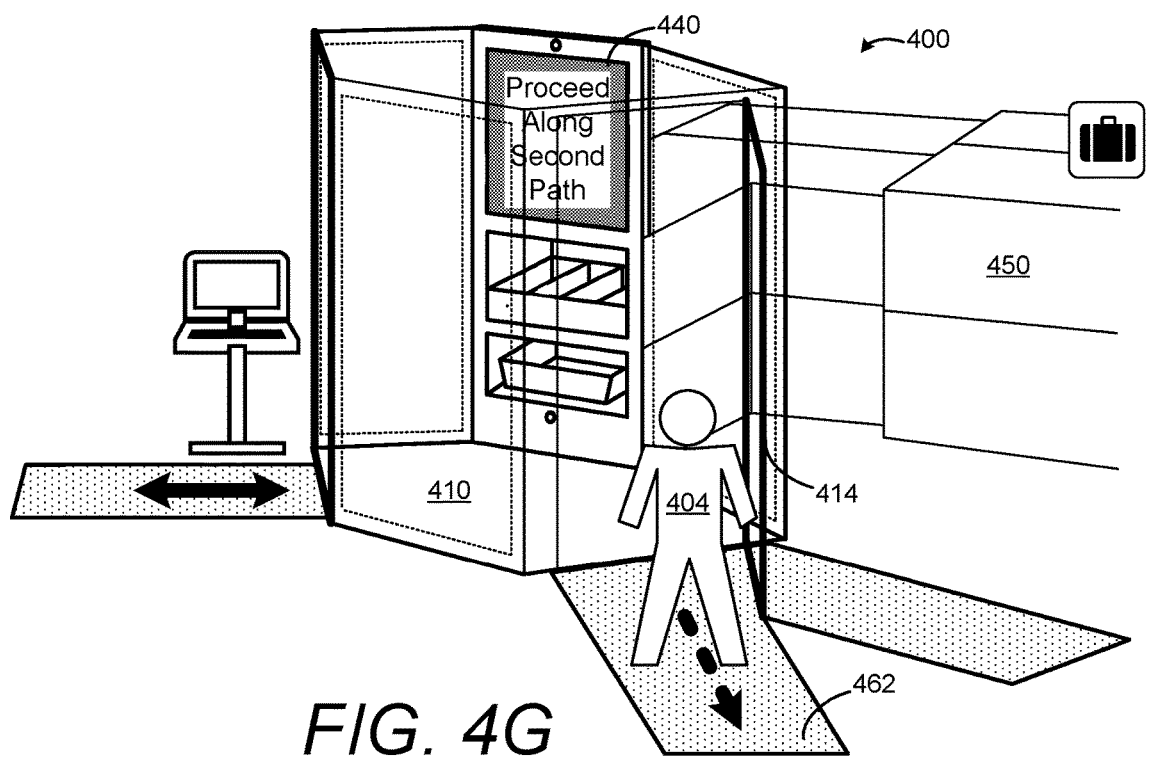

FIG. 4G illustrates the screening system 400 releasing the user 404 from the chamber 410. The user interface 440 provides instructional guidance to direct the user 404 along a specific one of the plurality of egress paths 462 (e.g., toward the terminals or recompose area, and not the secondary screening, based on positive outcome of the automated screening by system 400). The types of controls and indications used by system 400 to control and/or direct the user 404 along a given path 462 can be varied (from very minor audio/visual indicators, up to heavily hardened and reinforced mechanical barriers) based on configuration of the access control hardware forming part of the chamber 410 itself, and/or based on variation in the software and interface indications. In an example, the system 400 is configured with hardware and software to meet security standards developed by the Transportation Security Administration (TSA). For example, the system 400 is compliant with TSA requirements documentation specifying a desired level of security, able to withstand forces sufficient to physically hold a user, and deploy a combination of capabilities such as visual/audible indications to direct the user. Example embodiments of system 400 employ a safety feature with an emergency override to allow the user 404 to force open the ingress and/or egress doors as a safety measure. The system 400 is capable of selectively disabling the emergency override, to have a safe mode for guiding users and allowing them to override the physical holding aspects of the system (similar to an alarmed emergency exit), and also a lockdown mode, to prevent dangerous users from escaping the chamber 410, and/or to contain a blast or otherwise be hardened against bombs or other threats. The system 400 can selectively disable the emergency override based on various scanning or observational results, as well as based on manual input from an agent.

Embodiments of system 400 use physical doors or other physical barriers, as illustrated in FIG. 4G. In other embodiments, system 400 does not use physical doors, and includes visual indications or other feedback (e.g., via user interface 440) to guide users 404. Physical doors or barriers are configurable to allow being pushed open, or locked down to resist user interaction. Although the various walls, doors, and other aspects of the system 400 are illustrated as being transparent, this is for the sake of illustrative convenience. Other example embodiments use opaque doors, walls, and/or other aspects of the system 400.

In the example of FIG. 4G, the user 404 was directed down the second egress path 462, based on the physical egress door 414 opening in a manner that blocks the first egress path and allows passage only along the second egress path 462. Upon failure to clear all alarms, the system 400 directs the user 404 along a dedicated path for resolution, or produces a printout/token that instructs the user 404 to proceed to secondary screening or to a further clearance process. In other embodiments, one or more of the egress paths 462 are shared among several automated systems 400, in order to further reduce labor that might be needed to attend to those multiple systems 400 (e.g., see example configuration layout shown in FIG. 6).

Figure 5:
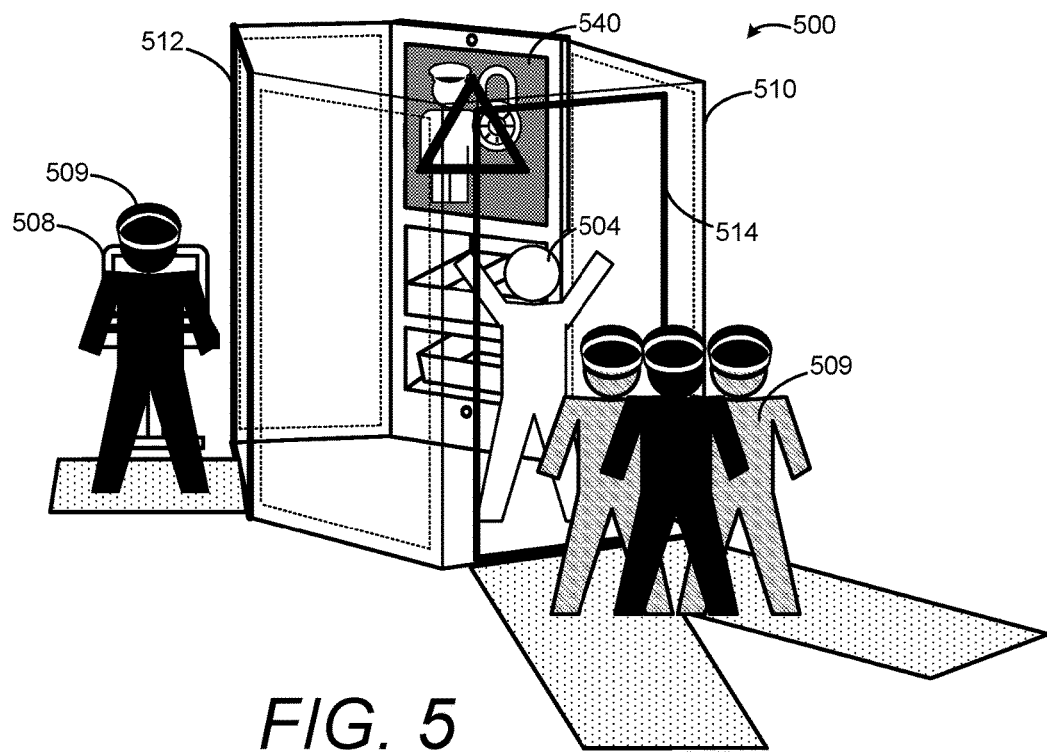
FIG. 5 illustrates a screening system operating in a lockdown mode according to an example embodiment.

FIG. 5 illustrates a screening system 500 operating in a lockdown mode according to an example embodiment. In the illustrated example embodiment, the user interface 540 displays a lockdown notice, and an audible alarm is sounded to summon the agents 509. In other embodiments, the system 500 notifies the agents 509 of an alarm condition via electronic communication, such as a text message or alert. The user 504 is held in the chamber 510 with the ingress door 512 and the egress door 514 locked. An agent 509 reviews the ingress interface 508 for status information, and the agent 509 decides whether to open the chamber 510 (e.g., open the egress door 514 after additional agents 509 are positioned to take custody of the user 504).

The chamber 510 is configured to hold the user 504 and summon the agents to resolve an anomaly, e.g., in response to the system 500 identifying an anomaly that is unresolvable by the automated/unstaffed screening process. The system 500 notifies on-site security personnel agents that assistance is needed at the chamber 510, and the system 500 maintains control of the user in the chamber 510 until agents 509 respond to the alarm condition. The system 500 sends pertinent alarm information and/or collected information to other systems, such as a secondary screening location, for resolution and further analysis (including updating of scanning and/or identity databases to which the system 500 is communicatively coupled, e.g., via networked ingress interface 508). In an example, the system 500 notifies a checked-baggage system to segregate and/or retain checked bags associated with the user 504 who has generated an alarm condition.

Example embodiments of system 500 include an indicator lamp disposed on an outside of the chamber 510, visible from a distance to indicate an alarm condition or other unresolved condition, or otherwise indicate that agent intervention is needed. Examples of system 500 include an integrated approach, by generating electronic alert indications and transmitting the alerts to wearables carried by agents. The system 500 includes wireless or wired networked embodiments, to send alerts or other information to a central distribution location for agents to view, or to send information directly to agents. For example, a clustered layout of multiple systems 500 (see FIG. 6), is attended by a number of roaming agents 509, any or all of which are equipped to receive alerts from any of the multiple systems 500. The system 500 allows the "unlocking" or resolution of an alarm condition, e.g., by having the agent 509 insert a key, swipe a security card, or provide other forms of agent authentication (biometric or other security token/device), to enable a secure release of the alarmed passenger by an authorized agent 509. Such agent authentications can be accepted at a central interface, and/or can be accepted locally at the chamber 510, or required locally at the chamber 510 in some embodiments to guarantee the presence of the agent 509 at the time of release. The agent 509 is able to provide manual verification (e.g., by viewing the user 504 through a window/door, and/or by viewing results at a central location in communication with the system 500, and/or locally via the interface 508 at the exterior of the chamber 510), to confirm that conditions warrant release of the user, whether by identifying an alarm item or user as being benign, or by ensuring that sufficient backup agents 509 are in position to secure the user 504. This approach to securing users for manual release also can be implemented at a divestment scanner, to securely hold for scrutiny by the agent 509 those divested items/bags that triggered an alarm condition, for the agent 509 to decide whether to release the alarmed item.

In an example embodiment, the system 500 applies cross-detection system analysis to an anomalous item, user, or other anomaly. Responsive to detecting an anomaly at an initial screening system (e.g., chamber 510 and/or a divestment scanner), the system 500 identifies what scanning system technology has been applied to the anomaly which led to identification of the alarm condition. The system 500 uses a second screening system to again examine the anomaly, the examination which can be performed automatically or in conjunction with agent participation/input. The second system uses sensor types and/or scanning technologies, or manual agent observation/evaluation, to identify characteristics of the anomaly that are orthogonal to characteristics of the anomaly that were obtained by the initial sensor examination (as well as to optionally obtain the same type of characteristics for redundancy checking). Data from the second examination is analyzed by the system 500, and if the orthogonally obtained characteristics confirm the initially obtained characteristics which triggered the alarm condition, the agent 509 may (among other options) provide the passenger with additional opportunities to divest the confirmed item. In contrast, if the orthogonally obtained characteristics do not match, the system 500 and/or the agent 509 can treat the alarm condition as a false alarm that needs to be re-scanned or manually examined to see whether to add the item to a whitelist or blacklist. Different systems can be used to cross-check each other automatically based on this approach, without need for agent input. If anomalous or prohibited items are removed from the user 504 and/or the chamber 510 (whether by self-directed user divestment at the divestment interface, confiscation by the agent, or other removal), the chamber 510 may be rescanned for validation that the alarming item was properly identified and removed (via the lack of a repeat alarm condition). Accordingly, the system 500 enables the agent 509 to resolve initial detection system alarms, e.g., by an iterative approach of removing item or items and re-scanning until the alarm condition is resolved. The secondary system, used for scanning alarm items for cross-checking purposes, is also configured to share anomaly characterization information, along with information describing how the anomaly was resolved by the agent 509, e.g., by electronically transmitting the information to be stored in a centralized database, which serves to further improve initial and secondary detection algorithm performance based on iterative feedback and learning.

The illustrated system 500 is capable of applying a variable security level of holding the user 504, corresponding to a risk score of the user 504. For example, under normal operational circumstances, the chamber 510 is configured to enable ingress doors 512 and/or egress doors 514 to be pushed open (triggering the sounding of an audible and/or visible alarm) in case of emergencies such as power failures or malfunctions, to allow an innocent user 504 to exit the chamber 510. However, in situations where the system 500 detects an imminent threat (such as the passenger having a firearm on their person or the system 500 identifying that an improvised explosive device (IED) is present) the system 500 causes the chamber 510 to go into lock-down mode to prevent the user 504 from exiting the chamber 510, in addition to notifying security personnel/ agents 509 of the identified threat. For example, the chamber 510 is equipped with deadbolts that default to an open state, unless the system 500 triggers an imminent threat condition and causes the deadbolts to move to a closed position locking the ingress/egress doors 512/514. Alternate examples, such as high-risk or high-security locations, implement deadbolts (or other mechanisms) that default to an engaged/locked position, unless the system 500 positively acts to disengage the deadbolts upon confirmation that the user 504 does not pose a threat.

FIG. 6 illustrates a layout of a system 601 including a plurality of screening systems 600 and divestment scanners 650 according to an example embodiment. The illustrated layout is attended and operated by a small group of agents 609, i.e., fewer agents than there are chambers 610 or divestment scanners 650. Similar to the system 201 shown in FIG. 2, the layout shown in FIG. 6 is based on a plurality of systems whereby multiple chambers 610 share a given divestment scanner 650. The egress doors 614 of the chambers 610 are oriented to facilitate a user exiting to a secure/recompose area 634 to collect items 602, or to direct the user onward toward an agent 609. Furthermore, a chamber 610 is oriented to open the ingress door 612 to admit a user from the unsecure area 636, close the ingress door 612 and scan the user, and if the user needs secondary screening, to open the ingress door 612 and direct the user back to an agent 609 and secondary screening 670 (which enables multiple chambers 610 to share the services provided by a single area for secondary screening 670, based on the routing and other configuration aspects of the illustrated layout).

In another example embodiment, the system 601 is unstaffed and fully automated to allow self-screening, capable of scanning users without any agents 609. Such fully automated systems are configured to receive users who self-divest under direction of the system 601. If the system encounters a condition that cannot be automatically resolved, the user is instructed by the system 601 to return to the unsecure area and proceed to a staffed processing system located elsewhere (which includes agents 609), or the system 601 can summon an agent to arrive at the unstaffed fully automated embodiment to address the unresolved condition.

The illustrated self-screening "cluster" set up is particularly conducive to the metering of passengers (i.e., processing users at chambers in other than first-come-first-served immediate access), which provides a synergistic effect in combination with the features described above relating to prescheduling of locations and windows of times during which the user self-screens. More specifically, the system 601 communicates with and intelligently directs users to wait or proceed to available chambers 610 to ensure efficient routing within the system 601. The system 601 achieves process efficiency by varying the arrival curve of users, e.g., to avoid surges that exceed capacity, as well as low capacity times that do not fully utilize the capacity of the system 601. In an example, the system 601 incentivizes users to arrive for screening by offering scheduled appointments based on screening availability, e.g., based on expected demand, flight times, and other factors. The system 601 schedules appointments to level the arrival curve and reduce peak screening demand. In an example, the system 601 extends various service level agreements/promises to users who arrange and/or accept scheduled appointments. For example, the system 601 identifies past trends in traffic and throughput through the system 601, which the system 601 uses as a baseline to extrapolate a predicted processing time. Thus, the system 601 extends a promised processing speed associated with a given type of prescheduled screening arrangement, e.g., if the user accepts a first prescheduled screening window of time, the user is guaranteed to complete screening in five minutes or less, and if the user arrives at a second screening window of time, the user is guaranteed to complete screening in 15 minutes or less. The system 601 determines a user's identity (e.g., via ingress interface 408) and accesses flight reservation information corresponding to the user identity, and assigns a corresponding screening chamber. Screening times are selectable by the passenger, within multiple options provided. The system 601 determines screening times while accounting for considerations for screening users having disabilities or special needs, and includes adjustments to screening protocols automatically. The system 601 also interfaces with Known Crew Member (KCM) and/or Law Enforcement Officer (LEO) databases to provide protocol-adjusted screening for those known user populations, incorporating such expected adjustments to predicted screening time completion. Each phase of screening performed by system 601 (e.g., identity management, on-person screening, carry-on property screening, and alarm resolution) is capable of being automatically and dynamically adjusted by system 601, e.g., according to passenger risk type, procedure set, or other individualized considerations.

The system 601 determines expected processing time and resources for a given user, and factors the information into how to manage available scanning resources between prescheduled users and/or unscheduled walk-up users. For example, the system 601 seamlessly creates a few seconds of lag between the time one chamber becomes available, and when the user at the front of the queue is directed to proceed to the available chamber. Accordingly, the lag time at any given moment ensures that a self-screening chamber is available for walk-ups, and the system 601 adjusts the number of seconds of lag incurred by walk-up users, to account for the anticipated prescheduled users (or any Pre-Check® users) in accommodating walk-up users while remaining capable of processing prescheduled and Pre-Check® users according to their scheduled times. Users who arrive at a designated prescheduled time are directed by the system 601 directly to an open chamber.

In another example embodiment, system 601 assigns a user a select screening window of time and location, during the passenger reservation and/or check-in process (online/on mobile device/at airport kiosk. For example, the system 601 instructs the user to please arrive at Checkpoint X, Self-Screening Station Y between 10:00 am and 10:05 am to receive expedited access. If the user fails to arrive during the prescheduled window of time, the system 601 relegates the user to walk-up status. The system 601 guarantees service availability to prescheduled users that participate and arrive within their window of time, by metering the processing of unscheduled "walk-up" users who did not preschedule or otherwise arrive outside of their assigned window. Such metering, or introduction of lag time, enables the system 601 to intelligently create slack in the utilization and availability of self-screening chambers, ensuring the immediate availability of a self-screening chamber for prescheduled users. By providing such benefits, the system 601 incentivizes users to arrive at prescheduled times, helping to level out arrival curves, creating greater efficiency in the scheduling and utilization of screening resources, and avoiding a need for checkpoint space that would have previously been set aside for queueing. Such space is not needed by system 601, and can be reclaimed or otherwise repurposed for additional screening equipment.

Such scheduling enhancements work in conjunction with the existing Pre-Check® systems. For example, the system 601 offers the described automated metering strategy (manage processing of users) to offer immediate chamber access as an additional perk for users who are signed up in the Pre-Check® program. The example system 601 allows Pre-Check® passengers to arrive at any time, even outside of a pre-selected window of time, and still enjoy immediate access to an open chamber (e.g., by directing users to wait before entering a chamber, while directing Pre-Check® users to proceed). In addition, system 601 adjusts such scheduling enhancements during the passenger reservation and/or check-in process, where a user may choose to indicate any special screening needs that the user may have (disability/preferred language), and which the system 601 accesses. If the user agrees to participate, the system 601 adjusts divestment/screening procedures of self-screening stations to account for this special user information. In an example, the system 601 identifies in advance that the user will need staff assistance during screening, and the system 601 requests screening staff be standing by when the user first arrives at the checkpoint, and/or directs the user to proceed to a system location at the airport including customized configurations of the self-screening stations. Such customized configurations are specifically configured to meet the user's specific screening needs (such as a special configuration of the self-screening system to screen users in wheel chairs).

In the illustrated system deployment configuration of FIG. 6, systems 600 are deployed in a vertical pattern (as oriented relative to the sheet in FIG. 6), to maximize utility of available space in the deployment area. Multiple systems 600 allow access from the unsecure area 636, and selectively permit users to the secure area 634. Such an example configuration is well-suited for medium to large security screening locations, in which passenger volume and resource optimization have increased consideration, as well as to unstaffed deployments whereby users can self-screen at a plurality of available chambers 610. The illustrated clustered configuration is well-suited to employ chambers 610 fitted with external lights or other indicators, to indicate the availability of an unoccupied chamber 610 to the next waiting user (e.g., waiting in a common/shared feeder line of users to be screened). Multiple feeder lines are compatible with various embodiments of system 601, such as including a first feeder line for Pre-Check® users, a second feeder line for prescheduled users, and a third feeder line for unscheduled walk-up users. At an airport deployment site, systems 600 can be integrated as a portion of the security scanning experience, or can be used to fully upgrade the site to the illustrated clustered configuration, as mission needs and available space considerations dictate for a given deployment site. For example, a hybrid installation includes the illustrated shared/grouped systems 600, alongside traditional staffed gates and baggage scanners. Although an example staffing arrangement of agents 609 is illustrated, any number of agents 609, including no agents, can be used in deployments of system 601.

The illustrated system 600 is capable of deploying and making available an always-open TSA Pre-Check® line, whether as one or more dedicated system or systems 600, or by dynamically re-configuring any of the systems 600 on-the-fly in response to that system 600 authenticating or otherwise establishing the identity of an authorized TSA Pre-Check® user about to be admitted into that system's corresponding chamber 610. Such establishing of TSA Pre-Check® identity can be accomplished as set forth above with reference to FIG. 4A. Accordingly, deployments such as the illustrated configuration of FIG. 6 are capable of processing regular users and TSA Pre-Check® users efficiently, while using on the order of half the agents as compared to more traditional configurations not based on example system 601. The illustrated deployment configurations are operable in unstaffed configurations, as well as with agents 609 roaming to attend to a suite of multiple systems 600, resulting in maximized personnel efficiency. Furthermore, unlike some existing TSA Pre-Check® operations that might be confined to dedicated security lanes with dedicated assigned personnel (which can become underutilized), any screening system 600 in the deployment of system 601 is operable in a customizable fashion, on-the-fly, to cater to the specific needs of a standard or TSA Pre-Check® user, maximizing the utilization of available space and staffing. The system 601 maximizes resource utilization by equitably dispersing the various type of users and/or user risk pools (e.g., different types of risk categories in which users can be categorized) to up to all available screening locations of the plurality of screening systems 600. Such freedom of dispersion across multiple systems 600 enables effective and customized variation of security screening per user, in view of user risk score, while simultaneously accommodating those users who participate in vetting programs (such as TSA Pre-Check®) by providing them a consistent and positive experience, seamlessly along with accommodating other users regardless of whether they participate.

The illustrated example area of secondary screening 670 is attended by agents 609 carrying hand-held scanners 672 that are usable to conduct the secondary screening of users, and/or perform pat-downs, to a needed degree of detail based on the type of situation that resulted in the user being designated as needing to report to the secondary screening 670. In an example embodiment, the system 601 relays the detection results (e.g., determined by scanning systems 600 based on user identity, risk score, scanning results, and so on as described above) to the agents 609 at the secondary screening 670, e.g., via an agent terminal and/or directly to the hand-held scanners 672 or other electronic communication device carried by the agents 609.

The system 601 is compatible with any type of approach for secondary screening 670, to resolve alarm conditions associated with a user as determined by a scanning system 600. The example system 601 automatically directs users to an appropriate area of secondary screening 670, including other areas not specifically illustrated in FIG. 6. In other examples, a given chamber 610 holds an alarming user and summons an agent 609 to escort the user, and/or perform an evaluation at the site of the chamber 610. In the illustrated clustered layout of system 601, many individual scanning systems 600 are configured to "funnel" users to the same secondary screening 670 area (e.g., regardless of whether a user exits the chamber 610 via the ingress door 612 or the egress door 614), thereby multiplexing the usage of the secondary screening 670 across multiple chambers 610. In another example embodiment, the system 601 includes multiple different tiers of secondary screenings 670, and the system 601 directs user to proceed to a designated one of the different secondary screenings 670 via a given corresponding one of multiple doors/paths, including access-controlled doors which, under coordinated and automated direction of system 601, prevent the user from deviating from a designated path. Such pathway/door controls are customizable, based on available personnel/agents 609 and available screening space in which the system 601 has been deployed.

Figure 7:
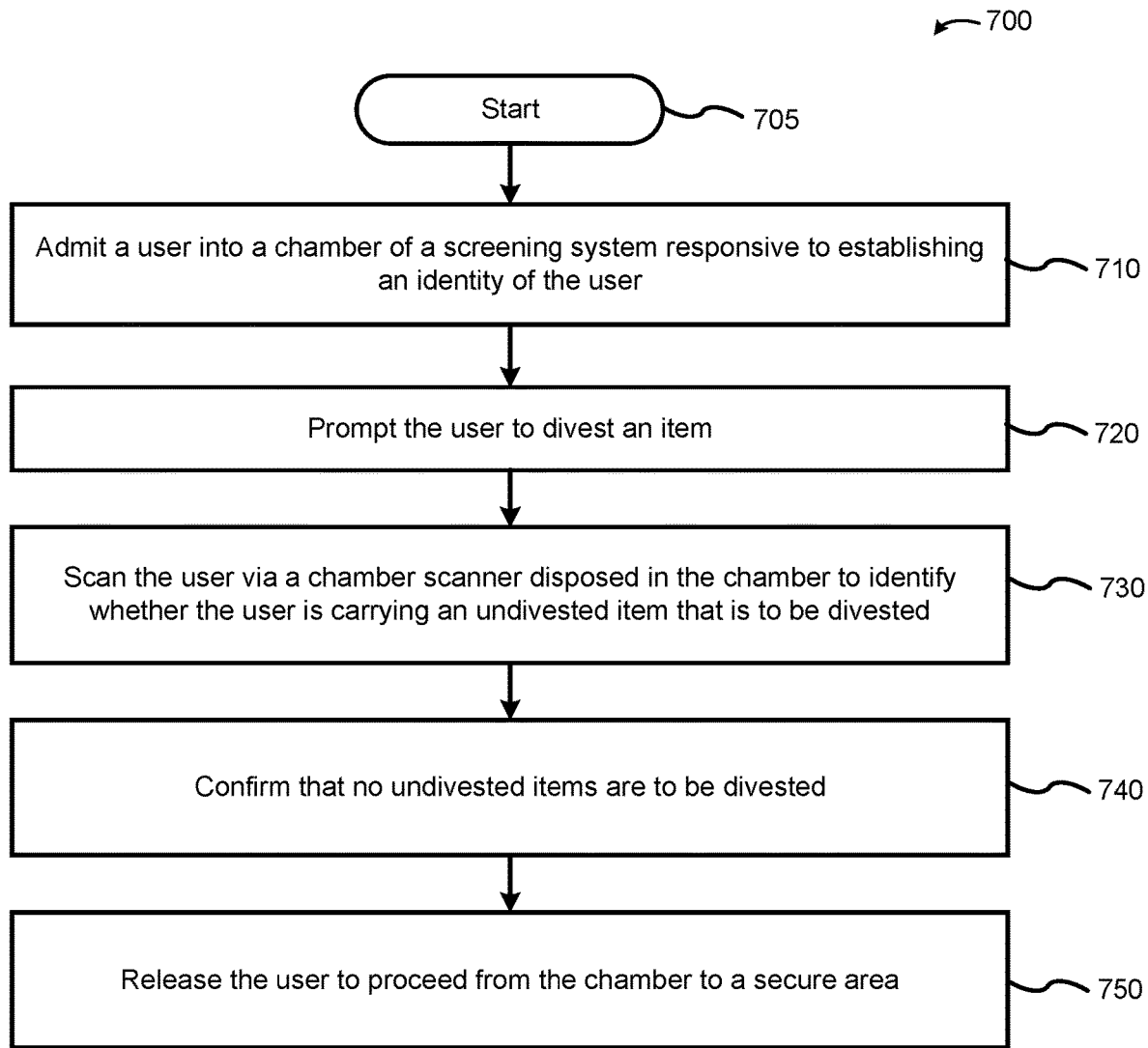
FIG. 7 illustrates a method of scanning and releasing a user according to an example embodiment.

FIG. 7 illustrates a method 700 of scanning and releasing a user according to an example embodiment. Flow starts at block 705. In block 710, the screening system admits a user into a chamber of the screening system responsive to establishing an identity of the user. For example, a system determines whether the user is prescheduled to receive screening at that time, or whether the user is a member of the Pre-Check® program. If so, the system directs the user to the next available scanning chamber. If not, the system treats the user as an unscheduled walk-up, and introduces a lag time during which the system directs the user to wait. During the lag time, the system allows another user (prescheduled or Pre-Check®), if applicable, to take the next available scanning chamber with priority over the unscheduled user. The user may have divested an item at a divesting area along an ingress path to a partially enclosed chamber that has an open side to receive the user. For example, the user may have previously undergone scanning, and was released from the chamber to self-divest in the unsecure portion of the airport before re-entering the chamber. In another embodiment, the chamber includes an ingress door that selectively admits the user, based on the screening system including a kiosk to prompt the user for identification. Upon verification of the identification, the system accesses local and/or remote databases to establish a security score for the user, and/or whether the user is prescheduled or a member of Pre-Check®. The system then opens an ingress door to the chamber, and closes the ingress door to hold the user in the chamber. In block 720, the screening system prompts the user to divest an item. For example, the chamber includes a user interface to display visual instructions and a video or still image depicting an example of the divestment procedure, such as a video showing the depositing of a coat and a mobile electronics device into a bin at the divestment interface. Alternatively, the system opens the ingress door to allow the user to self-divest outside the chamber, and/or directs the user to forfeit items into a secure drop box (within the chamber or outside the chamber). In block 730, the screening system scans the user via a chamber scanner disposed in the chamber to identify whether the user is carrying an undivested item that is to be divested. For example, the system monitors the user via an optical system to determine which of a plurality of scanners in the chamber to energize for scanning the user, based on a position and posture of the user. In an example, based on the risk score of the user, the system can operate the scanners according to a first mode for a low-risk user (e.g., reflective mode), and operate the scanners according to a second mode for high-risk users (e.g., transmissive mode). In block 740, the screening system confirms that no undivested items are to be divested. For example, the screening system performs multiple scans using different scanning technologies as part of a cross-detection system analysis scan of the user to confirm that no alarming items are found. If an alarming item is found, the system prompts the user to self-resolve the alarm, by divesting the item into the divestment interface of the chamber, and then re-scans the user. This procedure can be iterated a number of times, with the number of iterations being adjustable according to how busy the airport is, a risk score of the user, or other factors. Additionally, the system can allow the user to exit the chamber if needed, as part of the self-resolution process of resolving alarm conditions or other anomalies. In block 750, the screening system releases the user to proceed from the chamber to a secure area. For example, the screening system unlocks and opens a first egress door of the chamber, and displays instructions with helpful guidance to direct the user along the next path to collect divested items from an external divestment scanner interface and proceed toward the airport terminals. In another example, the screening system activates an external indicator to summon an agent, and unlocks and opens a second egress door of the chamber which leads to a secondary screening area. In yet another example, the screening system determines that items divested into the chamber's divestment interface are not prohibited, and instructs the user to collect the allowed divested items from the divestment interface and carry the items from the chamber to the secure area.

Figure 8:
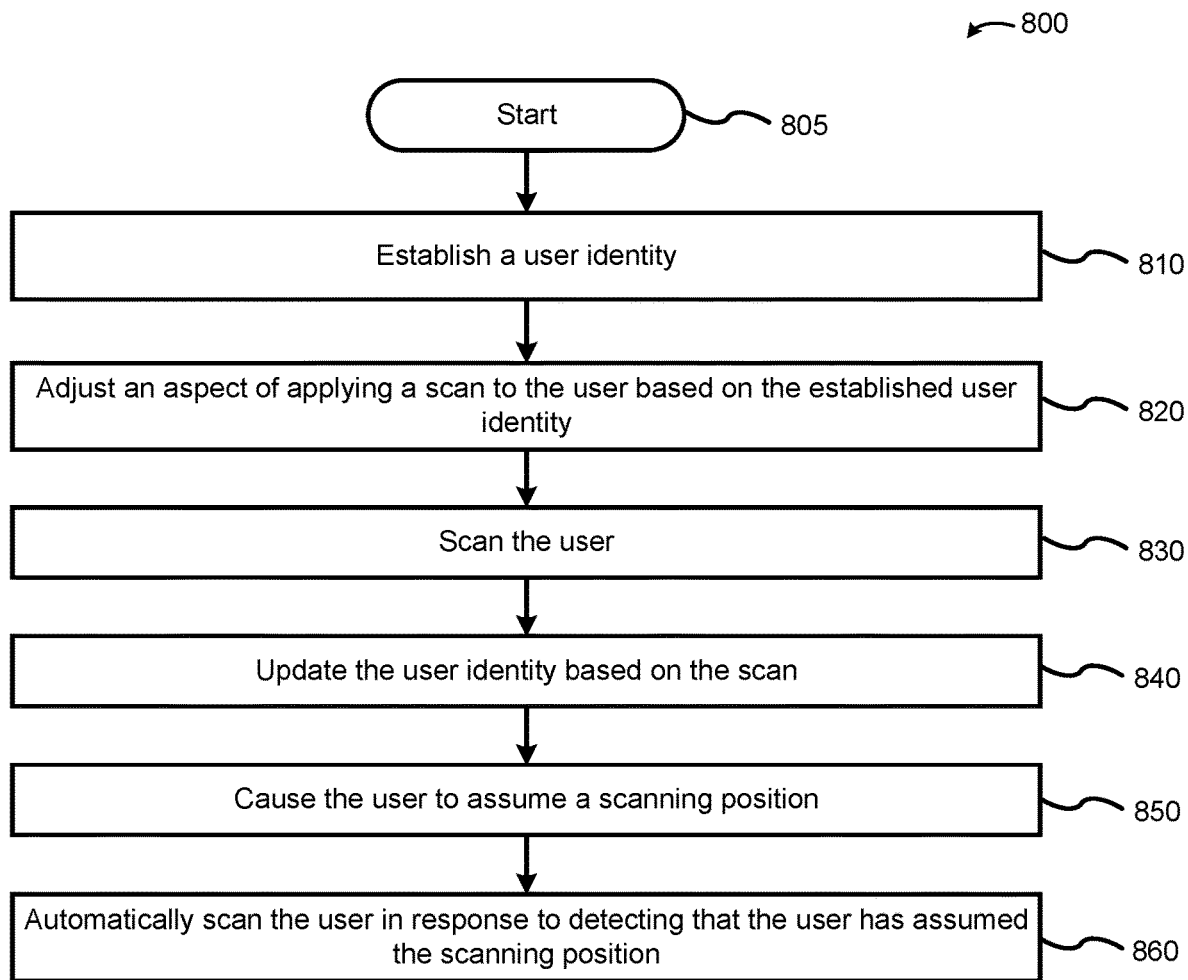
FIG. 8 illustrates a method of automatically scanning a user according to an example embodiment.

FIG. 8 illustrates a method 800 of automatically scanning a user according to an example embodiment. Flow starts at block 805. In block 810, the system establishes a user identity. For example, a chamber includes an ingress door that is closed until the user scans a user identification at a kiosk at the chamber. In another embodiment, the system does not include a kiosk at the chamber, and relies on a separate identification interface to establish the user identity. The identification interface can reside on site, and/or can include a remote server accessible via an online interface. The system queries local and/or remote databases to lookup information about the user, and establish a risk score for the user. Upon verifying the presented user identification, the system opens the ingress door allowing the user into the chamber. In block 820, the system adjusts an aspect of applying a scan to the user based on the established user identity. For example, the system determines a risk score for the user corresponding to a low risk, and adjusts the user guidance instructions presented to the user by instructing the user that it is not necessary to remove shoes or other items of clothing, nor is it necessary to divest belts or watches. Furthermore, the example system adjusts the chamber scanners to operate in a reflective mode, instead of a transmissive mode, corresponding to a low risk user security score. In another example, the system identifies whether the user is unscheduled as a walk-up (directing the user to wait), or is prescheduled for this location and window of time or is a member of Pre-Check® (directing the user to proceed to a chamber which the system has kept available in anticipation of the prescheduled/Pre-Check® user). In block 830, the system scans the user. For example, the system monitors the gestures and gait of the user based on video analytics of the recorded video from an optical system in the chamber, and determines that the user has assumed a scanning posture near one of the chamber scanners (e.g., grasping dual handles to actuate a divestment scanner interface door). The system analyzes that the gestures, facial expressions, and gait of the user do not pose a risk, and activates the corresponding chamber scanner near the user. The system also identifies, based on a combined analysis of the gestures and gait of the user, and cross-checking those results against the results of the reflective mode scan of the user, that the user is equipped with an artificial limb. In block 840, the system updates the user identity based on the scan. For example, the system updates a record for the user to add the information indicating that the user is equipped with an artificial limb and corresponding details. In block 850, the system causes the user to assume a scanning position. For example, the system instructs the user to divest a mobile phone, identified during the scan of the user, into a specifically located bin of the divestment interface of the chamber. The system has already determined the height and dimensions of the user based on the earlier scan, and calculates that in order to obtain a desired position for scanning the user, the user will need to reach toward a certain height, and the system is configured with multiple divestment bins and correspondingly different heights, and chooses the appropriate bin to cause the user to reach in the desired manner that positions the user's body appropriate for the scan to obtain needed scanning information of the user. In another embodiment, the system includes handles of a divestment interface, whose mechanism configuration automatically adjusts to accommodate the dimensions of the user (e.g., upon verifying the identity of the user, prior to the user entering the chamber), while ensuring that the user assumes a desired scanning position upon grasping the handles. In block 860, the system automatically scans the user in response to detecting that the user has assumed the scanning position. For example, the system has motion and weight detectors at the bins of the divestment interface, to detect that the user is interacting with the divestment interface. The system includes grip sensors to ensure that the user is safely gripping both handles of a divestment interface door before allowing the door to be opened. The system also uses video analytics of user activity captured by the optical system installed in the chamber. Accordingly, the system captures the automatic scan, enabling the system to confirm whether all items that need to be divested are divested, and allows the user to proceed.

Figure 9:
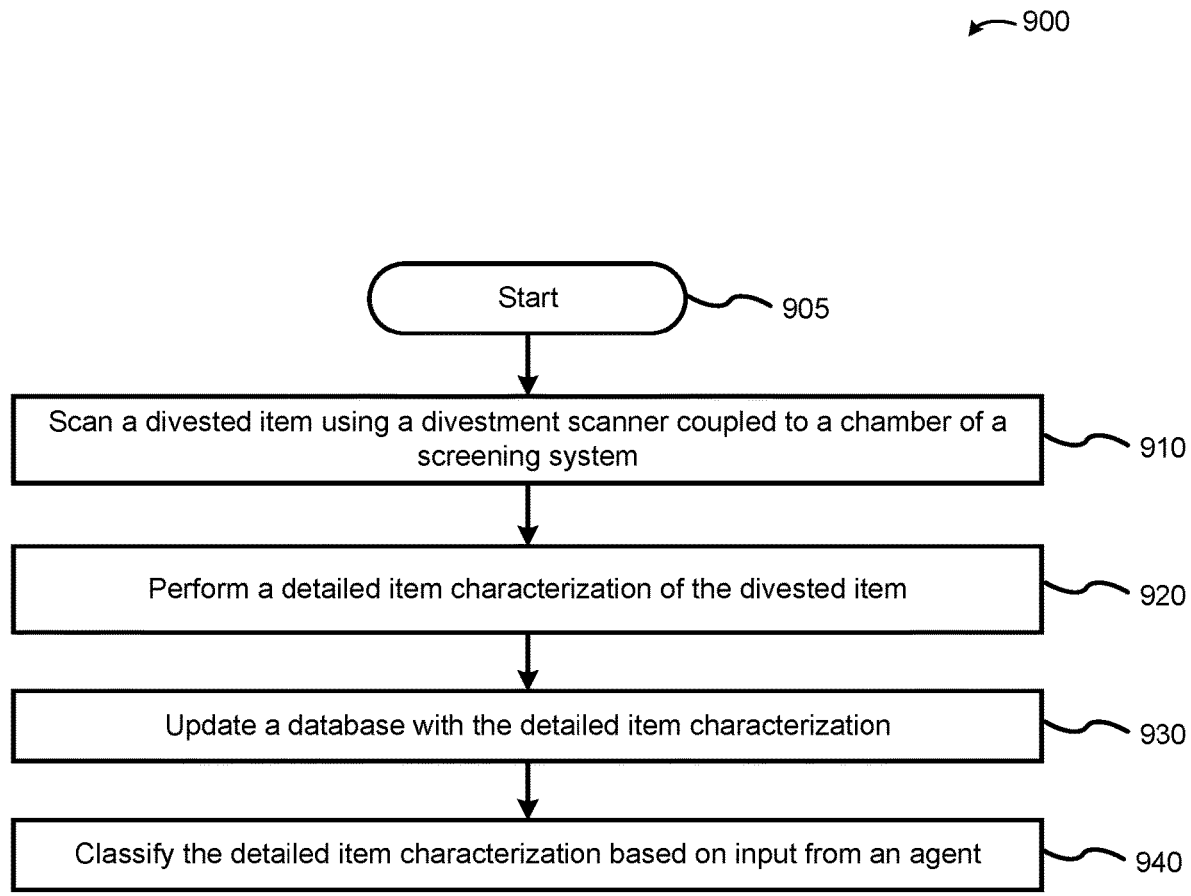
FIG. 9 illustrates a method of performing a detailed item characterization according to an example embodiment.

FIG. 9 illustrates a method 900 of performing a detailed item characterization according to an example embodiment. By way of introduction, an expansive library of threat articles, including threat characteristics/material discrimination (Z-eff/density), can be used to help identify whether an item matches a known threat. A system can also be designed to alarm on all detected objects/material that meet designated criteria, e.g., as identified in the library. The library can be used by systems to check whether a scanned item is in a threat library, or "blacklist," during the screening process, to generate automated alarms. Building and updating such libraries of data for threat articles can be very time/cost intensive, e.g., based on acquiring and validating large amounts of data in a controlled laboratory environment, processing and capturing thousands (or more) scans of various objects/material/individuals to update the library databases and/or detection algorithms. Additionally, the chemical composition/material density or other characteristics for a given item can vary among threat items of the same type (particularly for non-commercial/homemade explosives (HMEs)). This results in a large and complex dataset for libraries of threat items, resulting in a wide target range when attempting material discrimination for detection, which can contribute to a high false-alarm rate.

The aviation security threat environment is constantly evolving, leading to a need to update algorithms with new threat characteristics in real-time. With respect to item identification, new technologies such as 3-D printing allow for virtually limitless threat configuration, presenting challenges for systems that are based on blacklist object recognition for threat identification, and increased challenges for systems to respond in real-time to new threats or those threats that are not already contained in a threat library/database.

However, in contrast to such approaches, example embodiments described herein enable the development of software and secondary screening hardware that enables systems to achieve real-time data collection, on everyday live stream-of-commerce at security checkpoints during the screening process, to achieve continual deep-learning algorithm development. Example systems collect data on all items and continually refine, in the field, a library of known everyday objects (e.g., a "Whitelist") to complement a traditional "Blacklist" library of threats.

Training item detection and recognition algorithms in a lab setting, and building libraries/databases of "blacklists," is time consuming and costly. However, example systems described herein use a live stream-of-commerce of items encountered in the field, where an item that was encountered is put through a detailed quantification system (e.g., by using chamber scanners, divestment scanners, or other types of scanners deployed onsite) as described above, and the system captures and stores detailed characterization information for that item, thereby dynamically building a library of known and related items. Accordingly, the system learns to recognize items, within a given error rate, that enables the system to avoid falsely alarming on that item in the future.

Example systems enable libraries/databases of items to be cyclically developed and iterated upon, learning and revalidating item assumptions multiple times through live stream-of-commerce items, freeing the system to exceed the capabilities associated with lab-based closed systems. Furthermore, example systems are not confined to checking for prohibited items on a blacklist. Rather, example systems build item libraries robust enough to support whitelists, even with millions or more items, based on automated learning and/or daily input from agents, as performed in systems deployed for active use the field. Thus, rather than being confined to a relatively small blacklist of types of known threats, example systems can build, update, and leverage a whitelist of, e.g., 10 billion types of safe items, based on dynamic learning. Agents are involved in confirming that a given item, such as one that has been subjected to a detailed item characterization by a divestment scanner, is a safe item to enable systems to take advantage of human interaction and guidance in building and maintaining item databases/libraries.

If an example system encounters an unrecognized item, the system alarms on the item and incorporates feedback, discrimination loops, and results of secondary screening resolution, to classify the item as confirmed safe. The item also is fully characterized in, e.g., using a dedicated item characterization system, such as a cabinet x-ray, laser scanner, video/photography capture, or other analysis tool or tools, to obtain detailed/specific item information analysis in the field. Thus, rather than rely on positively matching a blacklist, example systems can err on the side of safety by attempting to positively identify an item as being on a safe whitelist. If the item is not found on the safe whitelist, the system assumes the item is bad/unsafe, without needing to positively match the item as being on a blacklist. In an example, a new laptop is released on the market, unlike previous laptops. Initially, a scanning system might alarm upon encountering the new laptop, because it does not recognize the laptop, which is then subjected to detailed item characterization and added to the systems database by (optionally) being verified by an agent as a whitelist candidate. Example systems communicate with an agent/operator, or a centralized database, to signal that the system has learned and incorporated the detailed item characterization for the newly released laptop, which is to be added to the whitelist database/library (with optional agent confirmation sought by the system), so that other systems will no longer alarm on the laptop. Such detailed item characteristic systems are incorporated into the system's chamber and/or divestment scanners, to create as much of a detailed item characteristic "fingerprint" for items encountered in the field.

Conducting alarm resolution enables example systems to obtain feedback from agents to reduce the occurrence of unnecessary/false alarms, resulting in vetted and robust libraries/databases for whitelists and blacklists. The example systems and their use of self-resolution of alarms, prunes out the likelihood of false alarms, allowing for resources to be focused on meaningful errors, not false alarms. Furthermore, example systems described herein leverage the time spent by passengers in divesting carry-on items, e.g., by automatically scanning the users during such activities. Thus, example systems achieve synergy in the elimination of a need for secondary alarms/resolution, while moving the user's divestiture activities into the scanner chamber, to enable the systems to perform scanning while a passenger is divesting, saving time and increasing efficiency in multiple ways.

Referring back to FIG. 9, flow starts at block 905. In block 910, the system scans a divested item using a divestment scanner coupled to a chamber of a screening system. For example, the divestment scanner includes multiple scanning technologies that are usable to perform a cross-detection system analysis scan, deploying technologies such as: millimeter wave scanners; backscatter x-ray scanners; nuclear quadrupole resonance (NQR) scanners; dielectrometry systems; metal detection systems; terahertz imaging systems; thermal imaging systems; explosive trace/odor detection via airflow sampling; 3D laser measurement/scanning systems; high-resolution camera systems; ramen laser analyzation systems; and/or future screening and material/dimensional characterization technologies. Such technologies can be deployed at the divestment scanner in series, e.g., deployed as an add-on along following the x-ray scanner along the x-ray belt.

In block 920, the system performs a detailed item characterization of the divested item. The detailed item characterization of the data capture system also can serve as a secondary screening alarm resolution system. For example, the item screening system uses various technologies to make a detailed characterization of objects that triggered an alarm in a scanning chamber configured to hold a user who carried the alarm item. Such items are individually loaded into an example object characterization/threat detection system, which carries out a two-fold step of performing the secondary screening action (such as explosive detection) while also capturing detailed characterization information about the item for use in algorithm development. The system also validates that the identified item is in fact that item which had been flagged by the primary detection system (user scanning chamber) for secondary screening, minimizing a chance that an unrelated item would inadvertently be mistaken as being the source of an alarm.

In block 930, the system updates a database with the detailed item characterization. For example, an alarming item is scanned by the data capture/resolution system and, along with the original primary security system data, is cataloged for utilization in algorithm development by sending the information to a database for storage. This allows the process of secondary screening to conduct item data capture cataloging, allowing the detection algorithm to receive information on the validity of its assessment. As new items are cataloged by these secondary screening systems, they are incorporated into a "secondary" detection algorithm that runs in addition to the "primary" detection algorithm on security screening systems. This secondary algorithm does not need to make security decisions (but can be used to make security decisions), and seeks to validate its ability to positively identify new items as candidates for whitelist/blacklist additions into the primary algorithm/database/library.

In block 940, the system classifies the detailed item characterization based on input from an agent. For example, the system uses the secondary detection algorithm to statistically validate its own ability to positively identify new blacklist and whitelist objects/items, and responsive to so validating, automatically incorporates the items into the primary detection algorithm, and/or recommends the items to a system manager for primary algorithm incorporation. In this manner, through iterative algorithm cycle development, the detection algorithm improves organically, as a byproduct of the screening process. Such features result in self-learning, such as in cases of false alarms (e.g., due to encountering clothing made of uncommon cloths/materials) whereby an agent provides feedback to the system after verifying a status of the alarming item (e.g., verifying whether the uncommon cloths/materials are safe for whitelisting or unsafe for blacklisting). The automated system uses the agent feedback information, to fine-tune its algorithm sensitivities for encountering future operations. The divestment scanning system and/or other scanners described herein collect and send detailed anomaly characterization information of the items, along with information describing how the agent resolved the anomaly (e.g., via agent guidance/input/feedback), to a database usable to further improve detection algorithm performance (initial and/or secondary). Such an approach is similarly used to identify which items are known to correlate with which types of user characteristics, such as known disabilities or medical conditions, and the items known to be allowable for accompanying the user to secure areas.

Over time the system increases its capabilities for positively identifying (e.g., via a whitelisting approach) the majority of items submitted to the scanning systems, whether via user scanners and/or on-property/on-person scanner detection systems. Accordingly, scanning systems are operable in a variety of modes (whitelist approach, blacklist approach, mixed approach, and so on), and include the capability of transitioning between modes over time, in view of available database item information, in view of the degree of agent knowledge and experience available (locally or remotely) to provide feedback to the scanning systems, how busy or backup the security processing lines are, whether it is desirable to adjust an average throughput of the security lines, and other factors. For example, a system can default to a hybrid approach, by erring on the side of alarming on all items that match a blacklist, and also erring on all items that are not specifically recognized. Over time, the system accumulates feedback from agents clearing the alarm conditions, and the system adds more items to a whitelist database, and accesses shared whitelists from other systems and/or central databases/libraries which the system accesses via computer networks. The system thereby learns the ability to identify the majority of items encountered by positively matching them to the whitelist or whitelists, wherein the system's primary detection algorithm converts from a primarily blacklist hybrid approach to one an approach that primarily relies on whitelist identification for security assessment. Under this example configuration, the system reduces the initial likelihood of alarming on all items/objects/materials that it cannot positively identify as innocuous, as the whitelist grows through usage. Accordingly, the system identifies a potential threat without needing to rely on positively finding a threat item in its blacklist library. This example approach enables the system to detect new/emerging threats in real-time, without needing to know any threat-specific information, due to the system's accumulated knowledge. Such detection capabilities exponentially improve detection algorithm performance and reduce false alarm rates in the primary security screening technologies incorporated into the example systems described herein.

Additionally, example systems described herein collect market/trend information based on the various items encountered in the field. The various databases of detailed item scan characterization information collected and built upon by example systems (whether managed by a security agency, deploying vendor, or other custodian of) represents useful, marketable information regarding user preferences for items, captured by the systems and usable for academic/market or other research purposes. Such information represents product utilization/consumption patterns of the traveling public, and includes correlating information regarding the specific geographic regions and user information (which can be anonymized), collected in real time. Such information is usable by industry to better understand product market share and refine regional product marketing strategies. Example systems described herein are customizable to obtain and/or retain such information as desired for a given study/research program or other uses.

While a number of example embodiments of the present subject matter have been described, it should be appreciated that the present subject matter provides many applicable inventive concepts that can be embodied in a wide variety of ways. The example embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A screening system comprising:
   a chamber configured to accommodate a user to be screened and cause the user, while advancing through the chamber, to assume a scanning position for a scanning duration;
   a chamber scanner configured to automatically scan the user, in response to detecting that the user has assumed the scanning position, to identify whether the user is carrying an undivested item that is to be divested; and
   the chamber being configured to release the user to proceed from the chamber to a secure area upon confirmation that no undivested items are to be divested.

2. The screening system of claim 1, wherein the chamber is configured to:
   upon detection of an undivested item that is to be divested, prevent the user from accessing the secure area;
   release the user to proceed from the chamber to an unsecure area; and
   permit the user to re-enter the chamber for re-scanning the user.

3. The screening system of claim 1, wherein the chamber further comprises a divestment interface configured to receive divested items.

4. The screening system of claim 1, further comprising a user interface disposed in the chamber and configured to prompt the user to divest the undivested item, responsive to identifying that the user is carrying the undivested item that is to be divested.

5. The screening system of claim 4, wherein the user interface is configured to display a body representation of the user overlaid with an item indication of the undivested item positioned corresponding to a location of the undivested item on the user.

6. The screening system of claim 1, further comprising a user interface disposed in the chamber and configured to, responsive to identifying that scanning information is needed, prompt the user to assume a scanning position conducive to obtaining the scanning information.

7. The screening system of claim 1, further comprising a divestment interface configured to receive an item divested from the user, wherein the divestment interface is coupled to a divestment scanner configured to scan the item divested from the user.

8. The screening system of claim 1, wherein the chamber includes a sensor to determine when the user is present and provide information to the chamber scanner to automatically begin scanning when the user or property of the user is in an acceptable position.

9. The screening system of claim 1, wherein the screening system is configured to, prior to scanning the user, establish a user identity and adjust an aspect of scanning the user based on the user identity.

10. The screening system of claim 9, wherein the screening system is configured to update the user identity based on scanning the user.

11. The screening system of claim 1, wherein the chamber scanner comprises a plurality of different scanning technologies configured to perform a cross-detection system analysis scan.

12. The screening system of claim 1, further comprising using a real-time video analytics system to identify an indicator of the user and the chamber scanner configured to adjust scanning according to the indicator.

13. The screening system of claim 1, further comprising a divestment interface configured to receive an item divested from the user, wherein the divestment interface is configured to cause the user, while divesting the item, to assume a scanning position for a scanning duration, and the chamber scanner is configured to automatically scan the user in response to detecting that the user has assumed the scanning position.

14. The screening system of claim 1, wherein the chamber is configured to control a chamber environment based on altering an environmental characteristic within the chamber.

15. The screening system of claim 1, wherein the chamber is configured to hold the user and summon an operator to resolve an anomaly.

16. The screening system of claim 15, wherein the chamber is configured to apply a variable security level of holding the user corresponding to a risk score of the user.

17. The screening system of claim 1, wherein the screening system is configured to communicate a result of screening the user to a secondary screening system.

18. The screening system of claim 1, wherein the chamber is configured to release the user to a selected one of a plurality of different ingress and egress paths according to a result of scanning the user.

19. A method for screening a user, comprising:
admitting the user into a chamber of a screening system responsive to establishing an identity of the user, the chamber being configured to cause the user, while advancing through the chamber, to assume a scanning position for a scanning duration;
prompting the user to divest an item;
scanning the user via a chamber scanner disposed in the chamber to identify whether the user is carrying an undivested item that is to be divested, the chamber scanner being configured to automatically scan the user in response to detecting that the user has assumed the scanning position;
confirming that no undivested items are to be divested; and
releasing the user to proceed from the chamber to a secure area.

20. The method of claim 19, wherein confirming that no undivested items are to be divested comprises identifying that undivested items are not prohibited and allowing the user to continue carrying the undivested items from the chamber to the secure area.

21. The method of claim 19, further comprising releasing the user to a selected one of a plurality of different ingress and egress paths according to a result of the scanning.

22. A screening system comprising:
an identification interface with at least one sensor to determine aspects of an identity of a user to be screened;
a database having identities of users and relevant scanning information associated with the identities of users;
a chamber configured to accommodate the user to be screened;
a screening scanner configured to scan the user to determine whether the user is carrying an undivested item; and
the screening system being configured to adjust an aspect of scanning the user based on the relevant scanning information associated with the identity of the user.

23. The screening system of claim 22, wherein the aspect of scanning that is adjusted is one of:
instructions for the user prior to entering the chamber;
a threshold of detection of a scanning algorithm for identifying the undivested item to reduce false positives;
the scanning algorithm selected; or
the undivested item the user must divest prior to releasing the user to proceed from the chamber to a secure area.

24. The screening system of claim 22, wherein the screening system comprises use of a real-time video analytics system that evaluates the user at or before the chamber to identify relevant scanning information associated with the identity of the user and adjusts the aspect of scanning the user according to an indication of the relevant scanning information associated with the identity of the user.

25. The screening system of claim 24, wherein the aspect of scanning the user is based on facial expressions, gait and gestures of the user.

26. The screening system of claim 22, wherein the screening system provides instructions for the user based on a known disability of the user and allows the user to proceed from the chamber to a secure area with items known to be associated with the known disability.

27. The screening system of claim 22, wherein the at least one sensor includes a government-issued identification scanner.

28. The screening system of claim 22, wherein the at least one sensor includes a fingerprint scanner, infrared signature scanner, retina scanner, or camera coupled with facial recognition software.

29. The screening system of claim 22, wherein for the user having a heightened risk score, the aspect of scanning adjusted is instructions prior to entering the chamber for the user having a heightened risk score.

30. The screening system of claim 22, wherein the identification interface determines the identity of the user and their gender, and wherein the aspect of scanning that is adjusted is scanning algorithms that are tailored for each gender.

31. The screening system of claim 22, wherein the identification interface determines the identity of the user and their body-type, and wherein the aspect of scanning that is adjusted is scanning algorithms that are associated with that body-type.

32. The screening system of claim 22, wherein the database includes the relevant scanning information for groups of users whose unique identity is not uniquely determined, but for whom aspects of their identity are determined by the at least one sensor.

33. The screening system of claim 22, wherein the database adjusts the relevant scanning information for the user based upon live information about the user that is determined by the identification interface.

* * * * *